(12) United States Patent
Borowy et al.

(10) Patent No.: US 7,545,132 B2
(45) Date of Patent: Jun. 9, 2009

(54) SENSOR-LESS, LOW FREQUENCY ADAPTIVE CURRENT LIMITER AND METHODS FOR LIMITING INDUCTIVE CURRENT USING THE SAME

(75) Inventors: Bogdan S. Borowy, Billerica, MA (US); Leo F. Casey, Lexington, MA (US)

(73) Assignee: Satcon Technology Corporation, Boston, MA (US)

( * ) Notice: Subject to any disclaimer, the term of this patent is extended or adjusted under 35 U.S.C. 154(b) by 386 days.

(21) Appl. No.: 11/373,722

(22) Filed: Mar. 10, 2006

(65) Prior Publication Data

US 2007/0210766 A1    Sep. 13, 2007

(51) Int. Cl.
*G05F 1/575* (2006.01)
*G05F 1/613* (2006.01)

(52) U.S. Cl. .................. 323/285; 323/222; 323/283

(58) Field of Classification Search .......... 323/222, 323/223, 282, 283, 284, 285, 351, 299, 300
See application file for complete search history.

(56) References Cited

U.S. PATENT DOCUMENTS

| | | | |
|---|---|---|---|
| 4,293,902 A | 10/1981 | White | 363/26 |
| 4,513,361 A | 4/1985 | Rensink | 363/21 |
| 4,928,200 A | 5/1990 | Redl et al. | 361/93 |
| 4,975,820 A | 12/1990 | Szepesi | 363/21 |
| 5,420,780 A | 5/1995 | Bernstein et al. | 363/89 |
| 6,400,544 B1 | 6/2002 | Grimm et al. | 361/94 |
| 6,650,095 B2 | 11/2003 | Aiello et al. | 323/267 |
| 6,841,979 B2 | 1/2005 | Berson et al. | 323/282 |
| 6,979,988 B2 * | 12/2005 | Sutardja et al. | 323/283 |
| 7,148,669 B2 * | 12/2006 | Maksimovic et al. | 323/283 |
| 7,292,013 B1 * | 11/2007 | Chen et al. | 323/222 |
| 2003/0090246 A1 | 5/2003 | Shenai et al. | 323/259 |

* cited by examiner

*Primary Examiner*—Gary L Laxton
(74) *Attorney, Agent, or Firm*—Weingarten, Schurgin, Gagnebin & Lebovici LLP

(57) ABSTRACT

Devices and systems that use an adaptively limited PWM duty-cycle to control a circuit and methods and control programs to operate and to control the devices and systems to adaptively limit the PWM duty-cycle are disclosed. The devices and systems are capable of adjusting the duty-cycle such that the actual inductor current in the next cycle is precisely limited. Specifically, a maximum allowable duty-cycle for time interval N+1 is estimated during time interval N. When the duty-cycle is applied to the circuit at time interval N+1, the peak inductor current is kept below a maximum allowable inductor current level.

20 Claims, 19 Drawing Sheets

SENSOR-LESS, LOW FREQUENCY ADAPTIVE CURRENT LIMITER AND METHODS FOR LIMITING INDUCTIVE CURRENT USING THE SAME

STATEMENT REGARDING FEDERALLY SPONSORED RESEARCH OR DEVELOPMENT

The United States Government has a paid-up license in this invention and the right in limited circumstances to require the patent owner to license others on reasonable terms as provided for by the terms of Contract Number DAAE07-03-C-L006 awarded by the Department of the Army's Tank-automotive and Armaments Command (TACOM).

CROSS REFERENCE TO RELATED APPLICATIONS

Not/Applicable

BACKGROUND OF THE INVENTION

Current ratings and current limits are a critical part of power electronic design. For example, active switching devices, such as MOSFETs, IGBTs or the like, have limited tolerance to current overload conditions. Indeed, saturation in magnetics, e.g., inductor saturation, is a performance limitation to avoid.

The actual failure mechanism that dictates performance limitations, however, can include thermal or fusing effects and/or dynamic limits such as di/dt limitations due to current crowding. To overcome failure with these switching devices, the duty ratio, i.e., the ratio of the ON portion of a cycle or pulse to the total time of the cycle or pulse, controls the switching function.

Referring to FIG. 1, there is shown a typical boost converter circuit 10. Boost converter circuits 10 are particularly sensitive to abnormalities, such as partial saturation of the boost inductor 15. Partial saturation is especially pronounced when several interleaved/parallel converters are controlled with a digital signal processing (DSP-)based controller. The information on the sampled current in each pulse-width modulation (PWM) pulse alone is inadequate as a prediction tool. More problematic, when deriving any duty-cycle constraint, there is an inductor current peak within each switching cycle. To complicate matters further, that peak current is not observable using standard DSP control techniques.

Conventional DSP controllers sample current at a pre-designated point within the PWM switching cycle, e.g., at or near the leading edge or the trailing edge of the cycle. However, the peak current for any cycle typically occurs contemporaneously when the switch changes state, i.e., going from OFF to ON. Furthermore, this operation is controlled by a hardware comparator that compares current measurements with a threshold current.

Although it is possible to build dedicated circuits to sample peak currents or, alternatively, to use software comparators to determine the instant of a switch state change, these techniques require additional hardware and/or computational overhead. Even if current were sampled accurately and in near real-time, current systems are not equipped to use this data to limit the current in the circuit.

Despite numerous publications on the benefits that digital control brings to power converters, few detailed techniques for limiting the instantaneous value of current have been published. There are, however, two major trends in controlling switch-mode converters. One calls for a PWM technique that utilizes linearized state-space averaging of a switched-mode converter and the other makes use of a current-mode control.

Use of linearized state-space averaging of a switched-mode converter is far more convenient for a DSP-based controller. Indeed, linear control techniques and linear control algorithms can achieve system performance and response in a manner that is well understood.

On the other hand, current mode controllers (CMC) control the peak value on a pulse-by-pulse basis automatically. A conventional CMC is hybrid controllers having a linear control implementation in an outer loop. However, these CMCs have some major drawbacks in industrial DC-DC converters, e.g., noise sensitivity and additional complexity. Furthermore, most modern converters use a form of digital control implementation, i.e., most modern converters are, typically, DSP-based.

Most forms of non-linear control use system models to predict performance and, moreover, make necessary adjustments based on the present state and input conditions, which is to say, before a change has occurred in the output(s). This is referred to as "feedforward" control.

It would be desirable to provide devices, systems, and methods to limit current in circuits without introducing unwanted noise sensitivity. Moreover, it would be desirable to provide devices, systems, and methods that address both inductor current saturation and maximum allowable device current; especially in an interleaved boost converter such as are being developed for hybrid electric vehicle propulsion buses.

It would also be desirable to provide an improved digital implementation of a new current limiting method that allows for over-current limitation on a pulse-by-pulse basis.

It would also be desirable to provide devices, systems, and methods that can realize these benefits without the addition of external circuitry or sensors.

BRIEF SUMMARY OF THE INVENTION

The present invention provides methods for more precise limitation of inductor current levels of a switched-mode converter in a boost during a continuous mode of operation. This can be accomplished by estimating the peak inductor current for the next PWM interval N+1. The methods comprise sampling the inductor current level, I(n+1), at or near the beginning of time interval N+1 and controlling the duty-cycle in time interval N+1 so that a peak current level at the end of time interval N+1, $I_p(n+1)$, does not exceed a maximum allowable current level, $I_{LIMIT}$.

Controlling the duty-cycle in time interval N+1 can include calculating a maximum allowable duty-cycle, $D_{MAX}(n)$, during time interval N for use in time interval N+1. Calculating the maximum allowable duty-cycle, $D_{MAX}(n)$, includes sampling the inductor current level at or near the beginning of time interval N, I(n); estimating the value of the inductor current at the end of time interval N; and measuring voltage inputs, $V_i(n)$, and voltage outputs, $V_o(n)$. In one aspect of the present invention, controlling the duty-cycle includes calculating a maximum allowable duty-cycle using the equation:

$$D_{MAX}(n) = (I_{LIMIT} - I(n))\frac{Lf_s}{V_i(n)} + \frac{V_o(n)}{V_i(n)}(1 - D(n-1)) - 1$$

where:
- I(n) is current at or near the beginning of time interval N;
- L is inductance;
- $f_s$ is frequency;
- $V_i(n)$ is one or more input voltages;
- $V_o(n)$ is one or more output voltages; and
- D(n−1) is a duty-cycle for time interval N calculated during interval N−1.

Additionally, a method is disclosed for calculating an allowable duty-cycle for a subsequent pulse width modulation interval N. The method comprises sampling a first inductor current level, I(n+1), at or near the beginning of time interval N+1; sampling a second inductor current level at or near the beginning of time interval N, I(n); estimating a value of the inductor current at the end of time interval N; and measuring voltage inputs, $V_i(n)$, and voltage outputs, $V_o(n)$. Moreover, the method comprises calculating a maximum allowable duty-cycle using the equation:

$$D_{MAX}(n) = (I_{LIMIT} - I(n))\frac{Lf_s}{V_i(n)} + \frac{V_o(n)}{V_i(n)}(1 - D(n-1)) - 1$$

where:
- I(n) is current at or near the beginning of time interval N;
- L is inductance;
- $f_s$ is frequency;
- $V_i(n)$ is one or more input voltages;
- $V_o(n)$ is one or more output voltages; and
- D(n−1) is a duty-cycle for time interval N calculated during time interval N−1.

In accordance with the disclosed technique, a method is also provided for controlling current levels in a circuit. A control program includes machine code that samples a first inductor current level, I(n+1), at or near a beginning of time interval N+1 and controls a duty-cycle so that a peak current level at the end of time interval N+1, $I_p(n+1)$, does not exceed a maximum allowable current level, $I_{LIMIT}$. More particularly, the program provides machine code to control the duty-cycle by calculating a maximum allowable duty-cycle, $D_{MAX}(n)$, during time interval N for use in time interval N+1.

The control program provides machine code to calculate the maximum allowable duty-cycle, $D_{MAX}(n)$, by sampling the inductor current level at or near a beginning of time interval N, I(n); estimating the value of the inductor current at the end of time interval N; and measuring voltage inputs, $V_i(n)$, and voltage outputs, $V_o(n)$. More specifically, the program provides machine code to control the duty-cycle by calculating a maximum allowable duty-cycle using the equation:

$$D_{MAX}(n) = (I_{LIMIT} - I(n))\frac{Lf_s}{V_i(n)} + \frac{V_o(n)}{V_i(n)}(1 - D(n-1)) - 1$$

where:
- I(n) is current at or near the beginning of time interval N;
- L is inductance;
- $f_s$ is frequency;
- $V_i(n)$ is one or more input voltages;
- $V_o(n)$ is one or more output voltages; and
- D(n−1) is a duty-cycle for time interval N calculated during time interval N−1.

Additionally, a control program comprising machine code is provided that calculates an allowable duty-cycle for a subsequent pulse width modulation interval N. The machine code is operative to sample a first inductor current level, I(n+1), at or near the beginning of time interval N+1; sampling a second inductor current level at or near the beginning of time interval N, I(n); estimating the value of the inductor current at the end of time interval N; and measuring voltage inputs, $V_i(n)$, and voltage outputs, $V_o(n)$. More specifically, the program provides machine code to calculate a maximum allowable duty-cycle using the equation:

$$D_{MAX}(n) = (I_{LIMIT} - I(n))\frac{Lf_s}{V_i(n)} + \frac{V_o(n)}{V_i(n)}(1 - D(n-1)) - 1$$

where:
- I(n) is current at or near the beginning of time interval N;
- L is inductance;
- $f_s$ is frequency;
- $V_i(n)$ is one or more input voltages;
- $V_o(n)$ is one or more output voltages; and
- D(n−1) is a duty-cycle for time interval N calculated during time interval N−1.

Furthermore, a system for controlling inductor current levels in a circuit is disclosed. The system can include a converter for delivering power to a load during a duty-cycle; a duty-cycle limiter for controlling the duty-cycle of the converter for any time interval N+1; and a controller that calculates a duty-cycle so that a peak current level during time interval N+1, $I_p(n+1)$, does not exceed a maximum allowable current level, $I_{LIMIT}$. More particularly, the duty-cycle limiter controls the duty-cycle using a maximum allowable duty-cycle, $D_{MAX}(n)$, for use in time interval N+1 that is calculated during time interval N.

The system can calculate the maximum allowable duty-cycle, $D_{MAX}(n)$, by sampling an inductor current level at or near the beginning of time interval N, I(n); by estimating the value of the inductor current at the end of time interval N; and by measuring voltage inputs, $V_i(n)$, and voltage outputs, $V_o(n)$. More specifically, the system calculates a maximum allowable duty-cycle using the equation:

$$D_{MAX}(n) = (I_{LIMIT} - I(n))\frac{Lf_s}{V_i(n)} + \frac{V_o(n)}{V_i(n)}(1 - D(n-1)) - 1$$

where:
- I(n) is current at or near the beginning of time interval N;
- L is inductance;
- $f_s$ is frequency;
- $V_i(n)$ is one or more input voltages;
- $V_o(n)$ is one or more output voltages; and
- D(n−1) is a duty-cycle for time interval N that is calculated during time interval N−1.

Alternatively, a system for calculating an allowable duty-cycle for a subsequent pulse width modulation interval N is provided. The system includes means for sampling a first inductor current level, I(n+1), at or near the beginning of time interval N+1; means for sampling a second inductor current level at or near the beginning of time interval N, I(n); means for estimating the value of the inductor current at the end of time interval N; and means for measuring voltage inputs, $V_i(n)$, and voltage outputs, $V_o(n)$. More specifically, the system calculates a maximum allowable duty-cycle using the equation:

$$D_{MAX}(n) = (I_{LIMIT} - I(n))\frac{Lf_s}{V_i(n)} + \frac{V_o(n)}{V_i(n)}(1 - D(n-1)) - 1$$

where:
   I(n) is current at or near the beginning of time interval N;
   L is inductance;
   $f_s$ is frequency;
   $V_i(n)$ is one or more input voltages;
   $V_o(n)$ is one or more output voltages; and
   D(n−1) is a duty-cycle for time interval N calculated during time interval N−1.

A device for controlling inductor current levels of a circuit is also disclosed. The device includes a controller that calculates an allowable duty-cycle so that a peak inductor current level during time interval N+1, $I_p(n+1)$, does not exceed a maximum allowable current level, $I_{LIMIT}$; and a duty-cycle limiter for controlling the duty-cycle of the circuit for any time interval N+1. More particularly, the duty-cycle limiter controls the duty-cycle for time interval N+1 using a maximum allowable duty-cycle, $D_{MAX}(n)$, calculated during time interval N.

The controller calculates the maximum allowable duty-cycle, $D_{MAX}(n)$, by sampling an inductor current level at or near the beginning of time interval N, I(n); by estimating the value of the inductor current at the end of time interval N; and by measuring voltage inputs, $V_i(n)$, and voltage outputs, $V_o(n)$. More specifically, the controller calculates a maximum allowable duty-cycle using the equation:

$$D_{MAX}(n) = (I_{LIMIT} - I(n))\frac{Lf_s}{V_i(n)} + \frac{V_o(n)}{V_i(n)}(1 - D(n-1)) - 1$$

where:
   I(n) is current at or near the beginning of time interval N;
   L is inductance;
   $f_s$ is frequency;
   $V_i(n)$ is one or more input voltages;
   $V_o(n)$ is one or more output voltages; and
   D(n−1) is a duty-cycle for time interval N calculated during time interval N−1.

Additionally, a device for calculating an allowable duty-cycle for a subsequent pulse width modulation interval N is disclosed. The device includes means for sampling an inductor current level, I(n+1), at or near the beginning of time interval N+1; means for sampling an inductor current level at or near the beginning of time interval N, I(n); means for estimating the value of the inductor current level at the end of time interval N; and means for measuring voltage inputs, $V_i(n)$, and voltage outputs, $V_o(n)$. More specifically, the devices calculate maximum allowable duty-cycle for time interval N using the equation:

$$D_{MAX}(n) = (I_{LIMIT} - I(n))\frac{Lf_s}{V_i(n)} + \frac{V_o(n)}{V_i(n)}(1 - D(n-1)) - 1$$

where:
   I(n) is current at or near the beginning of time interval N;
   L is inductance;
   $f_s$ is frequency;
   $V_i(n)$ is one or more input voltages;
   $V_o(n)$ is one or more output voltages; and
   D(n−1) is a duty-cycle for time interval N calculated during time interval N−1.

BRIEF DESCRIPTION OF THE SEVERAL VIEWS OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

DC/DC converters are readily modeled in state-space form. Indeed, because DC/DC converters are time-varying, by sampling inductor current at any point within a given cycle, one can accurately predict the change in current ($\Delta I$) for the remainder of the switching cycle given any input or source voltage(s) and/or any output voltage(s).

This change in current $\Delta I$ prediction can be extended at the beginning of the cycle for the entire cycle based on the controller duty-cycle. A predicted peak inductor current value, then, can be compared to an allowable current change or peak current. Based on the relationship between the predicted current value at the end of the cycle and the allowable peak current, a maximum allowable duty-cycle, $D_{max}(n)$, for any interval can be determined and, further, used as a dynamic limit on the duty-cycle.

Figure 1:
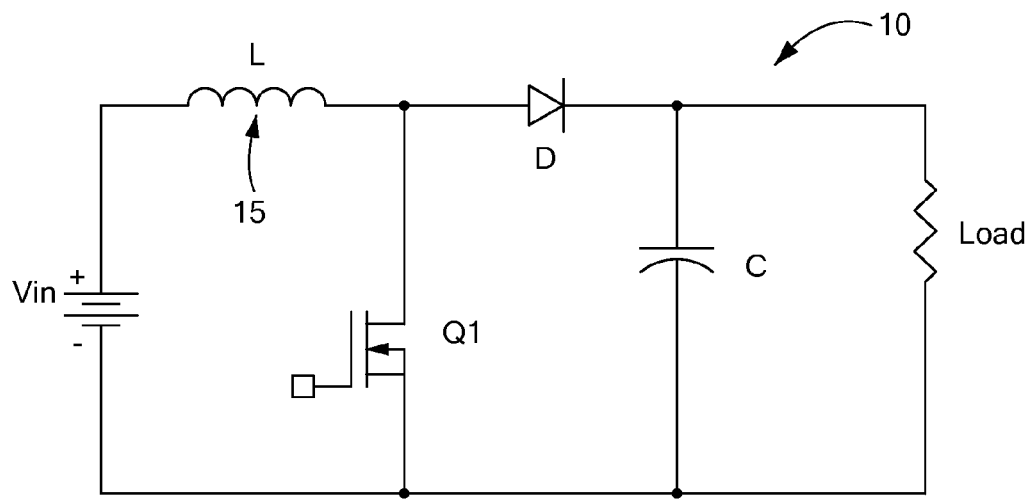
FIG. 1 provides a diagram of a conventional boost circuit.

Referring again to FIG. 1, there is shown a conventional boost converter circuit 10. As previously mentioned, information on the sampled inductor current during each pulse-width modulation (PWM) pulse, i.e., interval, alone is inadequate as a prediction tool—even for protection of the device. More problematic, when deriving any duty-cycle constraint, inductor current peaks within each switching cycle. That peak, however, is not observable.

Devices and systems that use an adaptively limited PWM duty-cycle to control a circuit as well as methods to operate and to control the devices and systems to adaptively limit the PWM duty-cycle are disclosed hereinafter. Advantageously, the devices, systems, and methods control the circuit based on a prediction of the device's peak current ($I_p$) during the next time interval.

This method and the devices and systems using the method are quite flexible and robust. The method can be practiced directly inside the interrupt service routine of the DSP controller and/or it can be implemented in the form of a lookup table operating outside of the main control algorithm in the output stage.

Nearly all DSP-based controllers utilize interrupt service routine (ISR), which is a repeatable portion of a software algorithm. Typically, the ISR is event driven, which is to say that, either an external, i.e., hardware, condition or an internal, i.e., software, condition causes the DSP to interrupt current action and start that prescribed by the ISR routine. DSP-based controllers for switching converters compute the pulse width after the feedback variables have been sampled at the start of the PWM period. The computed duty-cycle is then applied in the next PWM interval. As a result, a delay equal to one PWM period is applied to the commanded pulse width.

Once the pulse width is determined, the hardware of the DSP forms and controls the duration of the electric pulse. At this point, the processor loses further controllability over the pulse. The proposed algorithm, capable of adjusting the duty-cycle such that the actual inductor current in the next cycle is precisely limited, can be simply inserted to the end of the ISR routine.

Alternatively, a lookup table that is addressed by sampled inductor current, input and output voltage levels, and the calculated duty-cycle can be used. The locations of the lookup table can hold pre-calculated limits of the duty-cycles for the addressed conditions. Advantageously, additional sensors are not needed for implementation of the proposed method.

Figure 3:
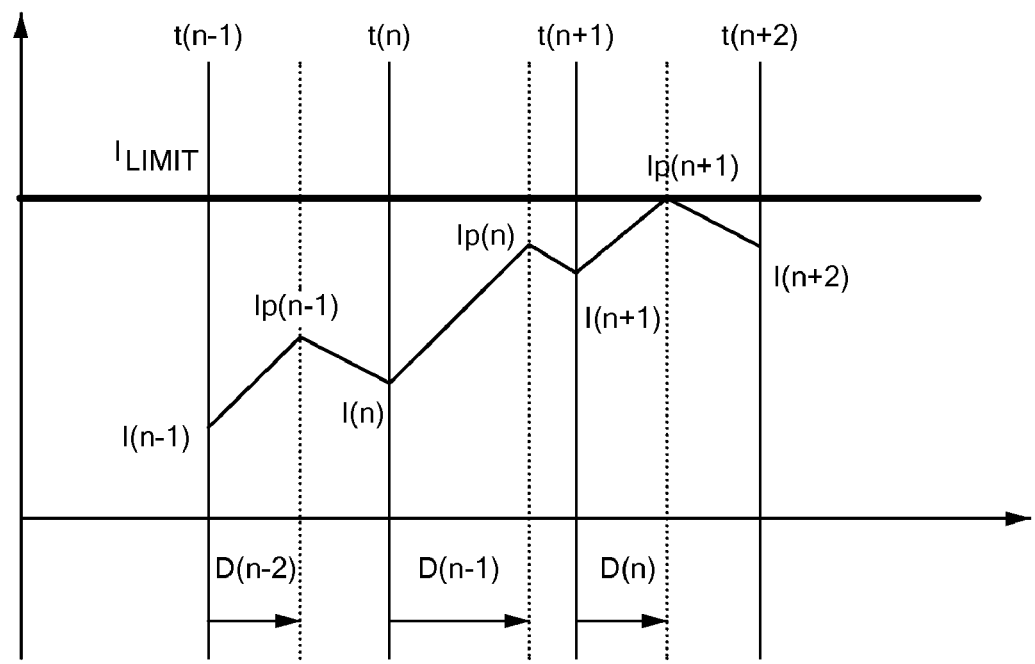
FIG. 3 provides an illustrative embodiment of inductor current waveform in accordance with the present invention.

Referring to FIG. 3, there is shown a representative inductor current waveform that depicts the effect and beneficial consequences of the embodied devices, systems, and methods. Before these devices, systems, and methods can be explained, mathematical relationships associated therewith will be explained.

The relationship between current and voltage for an inductor is given by the equation:

$$V = L\, di/dt$$

Hence, any change in current $\Delta I = (V/L) * \Delta t$ or $(V/L) * T_s * D(n)$, where $T_s$ is the switching period (in seconds) and $D(n)$ is the unit-less duty-cycle.

Therefore, assuming that variations in input voltage and output voltage are insignificant on a pulse-by-pulse basis, the basic duty-cycle constraint, $I_p(n+1)$, for time interval N+1 can be expressed as:

$$I_p(n+1) = I(n+1) + \frac{V_i(n)}{L} D(n) T_s \qquad [1]$$

$$I_p(n+1) \le I_{LIMIT}$$

where:

$V_i(n)$ is the input, i.e., source, voltage sampled at time $t(n)$;
$T_s$ is the switching period (=1/fs);
L is the inductance of the inductor;
$D(n)$ is the predicted duty-cycle for interval N+1 calculated during interval N; and
$I_{LIMIT}$ is the maximum allowable inductor current.

The value of the current at the beginning of time interval N+1, i.e., $I(n+1)$, in Equation [1] can be estimated in accordance with the following equations:

$$I(n+1) = I_p(n) + \frac{V_i(n) - V_o(n)}{L}(1 - D(n-1))T_s \qquad [2]$$

$$I_p(n) = I(n) + \frac{V_i(n)}{L} D(n-1) T_s$$

where $V_o(n)$ is the output voltage(s) sampled at time $t(n)$ and the quantity $(1-D(n-1))$ refers to the deviation from the maximum allowable duty-cycle for time interval N, $\Delta D_n$.

Accordingly, the duty-cycle for interval N+1 can be estimated during time interval N. Moreover, the maximum allowable duty-cycle, $D_{MAX}(n)$, for application during time interval N+1 can be determined during interval N using the following equation:

$$D_{MAX}(n) = (I_{LIMIT} - I(n))\frac{Lf_s}{V_i(n)} + \frac{V_o(n)}{V_i(n)}(1 - D(n-1)) - 1 \qquad [3]$$

where $f_s$ is the PWM switching frequency.

Figure 2:
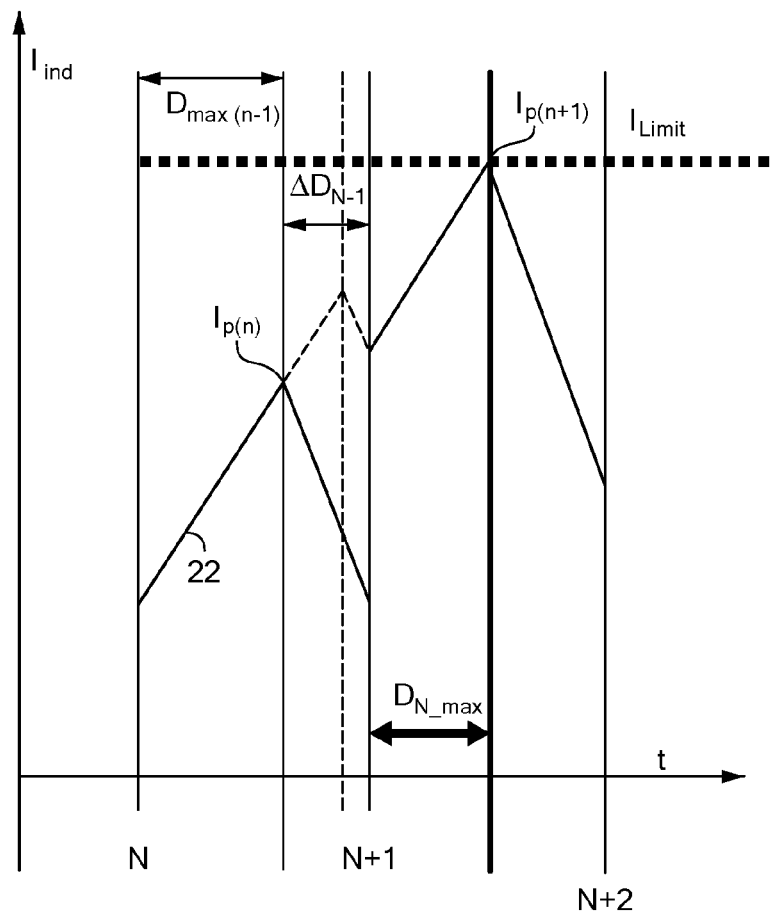
FIG. 2 provides an illustrative embodiment of a model for predicting the maximum allowable duty-cycle in accordance with the present invention.

FIG. 2 provides a model for predicting a device's peak inductor current in the N+1-th cycle, i.e., $I_p(n+1)$, for the purpose of limiting the duty-cycle. In FIG. 2, the abscissa corresponds to inductor current, $I_{ind}$ or $I_L$, and the ordinate is time, t, where time is represented by the intervals, . . . , N, N+1, N+2, . . . and so forth.

Each time interval has a nominal cycle time, $D_{NOM}$. The nominal cycle time for time interval N in FIG. 2 is composed of a maximum allowable duty-cycle, $D_{MAX}(n-1)$, which was calculated during the previous time interval N−1, and its complement $(1-D_{MAX}(n-1))$ or deviation time, $\Delta D_{N-1}$. The slope of the current prediction line 22 in time interval N is equal to the change in inductor current divided by the predicted maximum allowable duty-cycle, i.e., $m=\Delta I/D_{MAX}(n-1)$, where $\Delta I$ is equal to $I_p(n)-I(n)$. Accordingly, using equation [2] above, $\Delta I=(V_i(n)/L)*D_{MAX}(n-1)*T_s$.

As a result, during the present time interval N, the model predicts a maximum allowable duty-cycle for the next time interval N+1, $D_{MAX}(n)$, using sampled inductor current data from the previous interval N−1, a sample current value, I(n), from the present PWM interval N; input voltage data, $V_i(n)$, from the present PWM interval N; output voltage data, $V_o(n)$, from the present PWM interval N; and the value of the inductor current at the end of the present interval N, $\Delta D_{N-1}$.

An initial inductor current value, I(n), can be sampled or measured at or near the beginning of the time interval N. Alternatively, an initial inductor current value, I(n), could be sampled or measured at or near the very end of the previous time interval N−1. For practical reasons well known to those of ordinary skill in the art, the duty-cycle for the sampled current, I(n), during interval N, is less than or equal to the predicted maximum allowable duty-cycle, $D_{MAX}(n-1)$, which was estimated during the previous interval N−1.

Once an initial inductor current value, I(n), is measured, the peak current in the N-th cycle, $I_p(n)$, can be estimated. Indeed, the peak inductor current in interval N, $I_p(n)$, can be calculated using this initial current value, I(n), the measured input voltage(s), $V_i(n)$, and the predicted duty-cycle, D(n−1) using equation [2].

These data, i.e., $I_p(n)$, $V_i(n)$, and D(n−1), as well as the measured output voltage(s), $V_o(n)$, can then be used in conjunction with equation [2] to estimate the value of the inductor current in the N-th cycle, I(n+1). The estimated inductor current value in the N-th cycle then serves as an estimated initial value of the inductor current in the next interval N+1, which can be used to estimated a maximum allowable duty-cycle, $D_{MAX}(n)$, for the N+1-th cycle using equation [3].

In short, the peak inductor current for any future interval N+1, $I_p(n+1)$, is predicted one cycle or time interval ahead, i.e., at time t(n), which is to say that the data are fed forward. Furthermore, the predicted peak current, $I_p(n+1)$, is used during interval N+1 to calculate a maximum allowable duty-cycle for interval N, to maintain the peak inductor current at or below a predefined or desired current level, $I_{LIMIT}$.

More specifically, referring to FIG. 3, inductor current in the N+1 interval, i.e., the interval beginning at time t(n+1) and ending immediately before time t(n+2), is limited to a value $I_{LIMIT}$. During the N+1 time interval, the duty-cycle, D(n), that is used to limit the inductor current to the peak value, $I_p(n+1)$, is computed in the previous cycle based on the current, I(n), sampled at or near time t(n). Consequently, the allowable maximum value setting a limit on the control based in n-interval calculations of the duty-cycle is a function of sampled values of the inductor current I(n) at or near t(n); sampled value of the input (source) voltage, $V_i(n)$; sampled value of the output voltage, $V_o(n)$; and switching frequency, $f_s$.

Having described the prediction model of the present invention, methods for controlling inductor current levels during a time interval N+1 will be described. The methods for controlling inductor current levels include, first, sampling a first inductor current level, I(n+1), at or near the beginning of time interval N+1; and, then, controlling the duty-cycle of time interval N+1 so that peak current levels at the end of time interval N+1, $I_p(n+1)$, do not exceed a maximum allowable current level, $I_{LIMIT}$. Those skilled in the art can appreciate that sampling the first inductor current level, I(n+1), at or near the beginning of time interval N+1 can include sampling the inductor current level immediately before of immediately after time t(n+1) because the current levels on either side of time t(n+1) immediately before and immediately after are very close to being the same.

Controlling the duty-cycle of time interval N+1 includes calculating a predicted maximum allowable duty-cycle, $D_{MAX}(n)$, during time interval n for use in time interval N+1. Specifically, calculating the predicted maximum allowable duty-cycle, $D_{MAX}(n)$, includes sampling a second inductor current level at or near the beginning of time interval N, I(n); estimating the value of the inductor current at the end of time interval N; and measuring the voltage input(s), $V_i(n)$ and the voltage output(s), $V_o(n)$. More specifically, controlling the duty-cycle in interval N+1 includes calculating a maximum allowable duty-cycle during interval N using the equation:

$$D_{MAX}(n) = (I_{LIMIT} - I(n))\frac{Lf_s}{V_i(n)} + \frac{V_o(n)}{V_i(n)}(1 - D(n-1)) - 1$$

where:
I(n) is current at or near the beginning of time interval N;
L is inductance;
$f_s$ is frequency;
$V_i(n)$ is input voltage(s);
$V_o(n)$ is output voltage(s); and
D(n−1) is the a duty-cycle for time interval N estimated during time interval N−1.

Here again, those skilled in the art can appreciate that sampling the second inductor current level, I(n), at or near the beginning of time interval N can include sampling the inductor current level immediately before of immediately after time t(n) because the current levels on either side of time t(n) immediately before and immediately after are very close to being the same.

A method for calculating an allowable duty-cycle for a subsequent pulse width modulation interval N is also disclosed. The method includes sampling a first inductor current level, I(n+1), at or near the beginning of time interval N+1; sampling a second current level at or near the beginning of time interval N, I(n); estimating the value of the inductor current at the end of in time interval N; and measuring voltage input(s), $V_i(n)$ and voltage output(s), $V_o(n)$. More specifically, the method includes calculating a maximum allowable duty-cycle using the equation:

$$D_{MAX}(n) = (I_{LIMIT} - I(n))\frac{Lf_s}{V_i(n)} + \frac{V_o(n)}{V_i(n)}(1 - D(n-1)) - 1$$

where:
I(n) is current at or near the beginning of time interval N;
L is inductance;
$f_s$ is frequency;
$V_i(n)$ is the sum of all input voltages;
$V_o(n)$ is the sum of all output voltages; and D(n−1) is a duty-cycle for time interval N predicted during interval N−1.

Here again, those skilled in the art can appreciate that sampling the first inductor current level, I(n+1), at or near the beginning of time interval N+1 can include sampling the inductor current level immediately before of immediately after time t(n+1) and sampling the second inductor current level, I(n), at or near the beginning of time interval N can include sampling the inductor current level immediately before of immediately after time t(n).

Having described various methods for implementing the present invention, control programs for implementing the methods and processes will be described. Control programs that are executable on a processor provide machine code that samples a first inductor current level, I(n+1), at or near a beginning of time interval N+1; and that, further, controls a duty-cycle during time interval N+1 so that a peak current level during time interval N+1, $I_p(n+1)$, does not exceed a maximum allowable current level, $I_{LIMIT}$. Moreover, the control programs also include machine code to control the duty-cycle by calculating a maximum allowable duty-cycle, $D_{MAX}(n)$, during time interval N for use in time interval N+1. Specifically, the control program provides machine code to calculate the maximum allowable duty-cycle, $D_{MAX}(n)$, for interval N+1 by sampling a second inductor current level at or near the beginning of time interval N, I(n); to estimate the value of the inductor current at the end of in time interval N; and to measure voltage input(s), $V_i(n)$ and voltage output(s), $V_o(n)$. More specifically, the control program includes machine code to control the duty-cycle by calculating a maximum allowable duty-cycle using the equation:

$$D_{MAX}(n) = (I_{LIMIT} - I(n))\frac{Lf_s}{V_i(n)} + \frac{V_o(n)}{V_i(n)}(1 - D(n-1)) - 1$$

where:
I(n) is current at or near the beginning of time interval n;
L is inductance;
$f_s$ is frequency;
$V_i(n)$ is input voltage(s);
$V_o(n)$ is output voltage(s); and
D(n−1) is a duty-cycle for time interval N that was estimated during interval N−1.

Similarly, a control program is disclosed that calculate an allowable duty-cycle for a subsequent pulse width modulation interval N. The control program includes machine code that samples a first inductor current level, I(n+1), at or near the beginning of time interval N+1; samples a second inductor current level at or near the beginning of time interval N, I(n); estimates the value of the inductor current at the end of in time interval N; and measures voltage input(s), $V_i(n)$ and voltage output(s), $V_o(n)$. More specifically, the control program provides machine code to calculate a maximum allowable duty-cycle using the equation:

$$D_{MAX}(n) = (I_{LIMIT} - I(n))\frac{Lf_s}{V_i(n)} + \frac{V_o(n)}{V_i(n)}(1 - D(n-1)) - 1$$

where:
I(n) is current at or near the beginning of time interval n;
L is inductance;
$f_s$ is frequency;
$V_i(n)$ is input voltage(s);
$V_o(n)$ is output voltage(s); and
D(n−1) is a duty-cycle for time interval N that was calculated during interval N−1.

Figure 4:
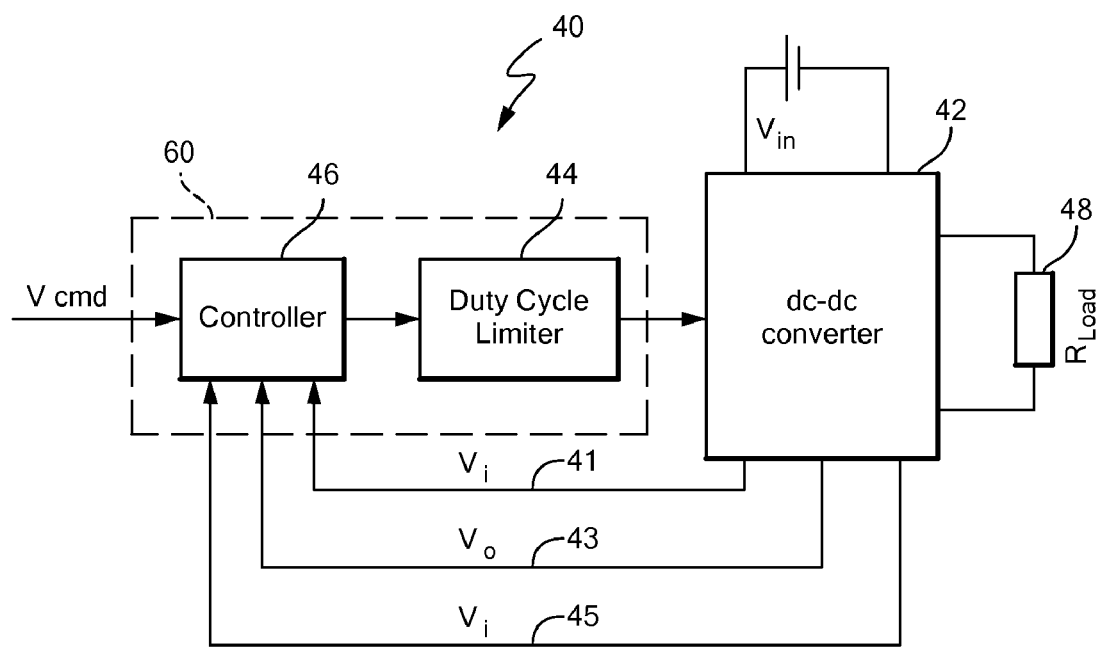
FIG. 4 provides a block diagram of preferred embodiments of a system and a device in accordance with the present invention.

Having described methods and control programs for implementing those methods, systems using the same will now be described. Referring to FIG. 4 there is shown a system 40 for controlling inductor current levels in a circuit in accordance with the present invention. The system 40 comprises a converter 42, e.g., a DC/DC converter, a duty-cycle limiter 44, and a controller 46. The converter delivers power to a load 48. The duty-cycle limiter 44 controls the duty-cycle of the converter 42 for any time interval N+1 and, more specifically, the duty-cycle limiter 44 controls the duty-cycle of the converter 42 during time interval N+1 using a maximum allowable duty-cycle, $D_{MAX}(n)$, that was calculated during time interval N.

The controller 46 receives data 41, 43, 45 during interval N and calculates a duty-cycle so that during time interval N+1, the peak current level, $I_p(n+1)$, does not exceed a maximum allowable current level, $I_{LIMIT}$. Specifically, the controller 46 calculates the maximum allowable duty-cycle, $D_{MAX}(n)$, by sampling a second current level at or near a beginning of time interval N, I(n); by estimating the value of the inductor current at the end of time interval N; and by measuring voltage input(s) 41 and 45, $V_i(n)$, and voltage output(s) 43, $V_o(n)$. More specifically, the system 40 calculates a maximum allowable duty-cycle using the equation:

$$D_{MAX}(n) = (I_{LIMIT} - I(n))\frac{Lf_s}{V_i(n)} + \frac{V_o(n)}{V_i(n)}(1 - D(n-1)) - 1$$

where:
I(n) is current at or near the beginning of time interval N;
L is inductance;
$f_s$ is frequency;
$V_i(n)$ is input voltage(s);
$V_o(n)$ is output voltage(s); and
D(n−1) is a duty-cycle for time interval N calculated during time interval N−1.

A system 40 for calculating an allowable duty-cycle for a subsequent pulse width modulation interval N is also disclosed. The system 40 includes sensors (not shown) or other means for sampling a first inductor current level, I(n+1), at or near the beginning of time interval N+1; sensors or other means (not shown) for sampling a second inductor current level at or near the beginning of time interval N, I(n); means (not shown) for estimating the value of the inductor current at the end of in time interval N; and devices or other means (not shown) for measuring voltage input(s), $V_i(n)$ and voltage output(s), $V_o(n)$. More specifically, the system 40 calculate a maximum allowable duty-cycle using the equation:

$$D_{MAX}(n) = (I_{LIMIT} - I(n))\frac{Lf_s}{V_i(n)} + \frac{V_o(n)}{V_i(n)}(1 - D(n-1)) - 1$$

where:
I(n) is current at or near the beginning of time interval N;
L is inductance;
$f_s$ is frequency;
$V_i(n)$ is input voltage(s);
$V_o(n)$ is output voltage(s); and D(n−1) is a duty-cycle for time interval N calculated during time interval N−1.

Figure 6:
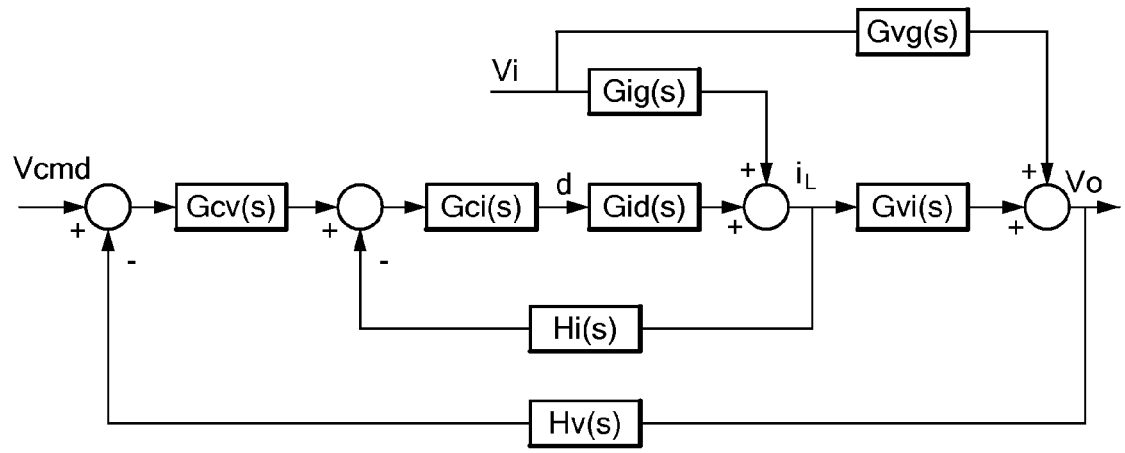
FIG. 6 provides a nested loop control block diagram.

Having described systems using the embodied methods and control programs, devices for controlling inductor current levels of a circuit will now be described. Referring to FIG. 6, the devices 60 comprise a controller 46 and a duty-cycle limiter 44. Although described as two separate elements, those skilled in the art will appreciate that the controller 46 and current limiter 44 can be embodied in a single unit.

The controller 46 calculates a duty-cycle during time interval N so that a peak current level during time interval N+1, $I_p(n+1)$, does not exceed a maximum allowable current level, $I_{LIMIT}$. The duty-cycle limiter 44 controls the duty-cycle of a converter 42 during time interval N+1 using a maximum allowable duty-cycle, $D_{MAX}(n)$, that was calculated during time interval N. Specifically, the device 60 calculates the maximum allowable duty-cycle, $D_{MAX}(n)$, by sampling a second inductor current level at or near a beginning of time interval N, I(n); by estimating the value of the inductor current at the end of time interval N; and by measuring voltage input(s) 41 and 45, $V_i(n)$, and voltage output(s) 43, $V_o(n)$. More specifically, the controller 46 calculates a maximum allowable duty-cycle using the equation:

$$D_{MAX}(n) = (I_{LIMIT} - I(n))\frac{Lf_s}{V_i(n)} + \frac{V_o(n)}{V_i(n)}(1 - D(n-1)) - 1$$

where:

I(n) is current at or near the beginning of time interval N;

L is inductance;

$f_s$ is frequency;

$V_i(n)$ is input voltage(s);

$V_o(n)$ is output voltage(s); and

D(n−1) is a duty-cycle for time interval N calculated during time interval N−1.

Similarly, the device 60 can be used for calculating an allowable duty-cycle for a subsequent pulse width modulation interval N. The device 60 comprises sensors or other means (not shown) for sampling a first inductor current level, I(n+1), at or near the beginning of time interval N+1; sensors or other means (not shown) for sampling a second inductor current level at or near the beginning of time interval N, I(n); means (not shown) for estimating the value of the inductor current at the end of time interval N+1; and sensors or other means (not shown) for measuring voltage input(s) 41 and 45, $V_i(n)$, and voltage output(s) 43, $V_o(n)$. Specifically, the device 60 calculate a maximum allowable duty-cycle using the equation:

$$D_{MAX}(n) = (I_{LIMIT} - I(n))\frac{Lf_s}{V_i(n)} + \frac{V_o(n)}{V_i(n)}(1 - D(n-1)) - 1$$

where:

I(n) is current at or near the beginning of time interval N;

L is inductance;

$f_s$ is frequency;

$V_i(n)$ is input voltage(s);

$V_o(n)$ is output voltage(s); and

D(n−1) is a duty-cycle for time interval N calculated during time interval N−1.

Modeling Results

To validate the embodied methods, control programs, systems, and devices, the inventors simulated operation of a single-stage boost converter using Matlab® and Simulink® software manufactured by The MathWorks, Inc. of Natick, Mass. Recognizing that state-space averaging is sufficient for a majority of power converter control modeling applications, a small-signal model of a DC/DC boost converter around a specific operating point was derived. The equations of state for the boost converter for both ON and OFF switch positions can be expressed as follows:

$$\frac{d}{dt}\begin{bmatrix}I_L \\ V_o\end{bmatrix} = \begin{bmatrix}0 & 0 \\ 0 & -\frac{1}{RC}\end{bmatrix}\begin{bmatrix}I_L \\ V_o\end{bmatrix} + \begin{bmatrix}\frac{1}{L} \\ 0\end{bmatrix}V_i \quad \text{for ON} \quad [4]$$

$$\frac{d}{dt}\begin{bmatrix}I_L \\ V_o\end{bmatrix} = \begin{bmatrix}0 & -\frac{1}{L} \\ \frac{1}{C} & -\frac{1}{RC}\end{bmatrix}\begin{bmatrix}I_L \\ V_o\end{bmatrix} + \begin{bmatrix}\frac{1}{L} \\ 0\end{bmatrix}V_i \quad \text{for OFF} \quad [5]$$

After applying state-space averaging, the "averaged" combined state equation becomes:

$$\frac{d}{dt}\begin{bmatrix}I_L \\ V_o\end{bmatrix} = \begin{bmatrix}0 & -\frac{D'}{L} \\ \frac{D'}{C} & -\frac{1}{RC}\end{bmatrix}\begin{bmatrix}I_L \\ V_o\end{bmatrix} + \begin{bmatrix}\frac{1}{L} \\ 0\end{bmatrix}V_i \quad [6]$$

where D and D' are the duty-cycle and its complement, i.e., 1-D, respectively, and R is the load resistance.

Treating the duty-cycle and the input, i.e., source, voltage as control variables of the boost converter, a small signal model using perturbations in duty-cycle and the input voltages was derived. The resulting small-signal equivalent circuit 50 for the boost converter is shown in FIG. 5.

Figure 5:
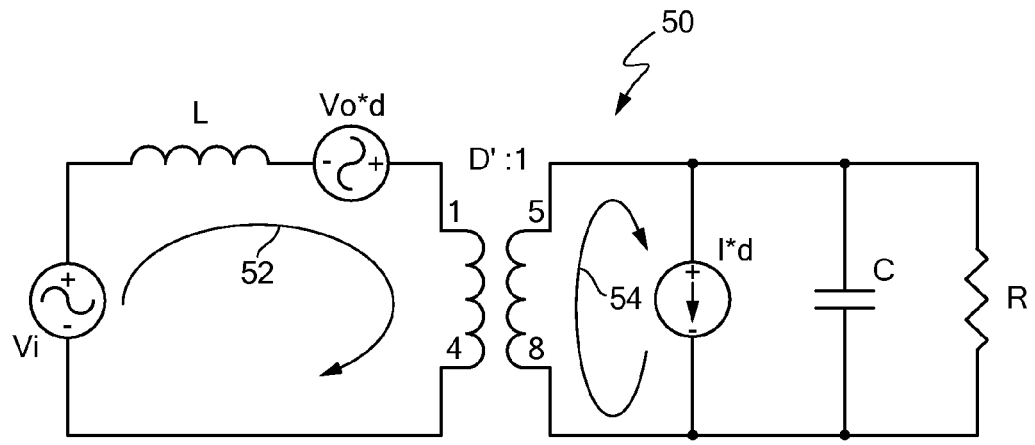
FIG. 5 provides a small-signal equivalent circuit for a boost converter.

For the circuit in FIG. 5, the small-signal inductor current can be expressed as:

$$\hat{i}_L = G_{id}\hat{d} + G_{ig}\hat{v}_i \quad [7]$$

where:

$$G_{id} = \frac{D'I_{L0} + V_{o0}C\left(s + \frac{1}{RC}\right)}{LC\left(s^2 + \frac{1}{RC}s + \frac{(D')^2}{LC}\right)} \quad [8]$$

$$G_{ig} = \frac{\left(s + \frac{1}{RC}\right)}{L\left(s^2 + \frac{1}{RC}s + \frac{(D')^2}{LC}\right)} \quad [9]$$

Using a nested-loop approach as a control structure, inductor current control can be performed in the inner, i.e., faster, loop 52 and output voltage control can be performed in the slower, outer loop 54. Thus, for the inner, inductor current loop 52, the transfer function $G_{id}(s)$ expressed as equation [9] can be the controlled plant. Further, for the outer, voltage loop 54 control, the output voltage $V_o$ can be expressed in terms of the inductor current, which is governed by the inner current loop 54, using the following equation:

$$\hat{V}_o = G_{vi}\hat{i}_L + G_{vg}\hat{v}_i \quad [10]$$

where the small-signal transfer functions $G_{vi}(s)$ and $G_{vg}(s)$ can be derived based on the equivalent circuit in FIG. 5 using the following equations:

$$G_{id} = \frac{D' - \frac{I_{L0}}{V_{o0}}Ls}{C\left(s + \frac{1}{RC} + \frac{I_{L0}D'}{V_{o0}}\right)} \quad [11]$$

$$G_{vg} = \frac{I_{L0}}{V_{o0}} \quad [12]$$

where $I_{L0}$ and $V_{o0}$ are the inductor current and output voltage steady-state values at a discrete operating point around which linearization was or can be performed. FIG. 6 provides an illustrative structure block diagram of the nested-loop controller.

The current loop controller Gci(s) and the voltage loop controller Gcv(s) were designed of a PI type using Matlab®. The actual parameters for an illustrative modeled system include:

L: 7.2 mH
C: 1000 μF
R: 163.3 Ω
$f_s$: 15 kHz
Linearization about a steady-state operating point: $V_{i0}$: 250V, $V_{o0}$: 700V, $I_{L0}$: 10A Accordingly, in a digitized form, the resulting PI controllers at a sampling rate of 15 kHz are given by the equations:

$$Gci(z) = \frac{0.14(z - 0.697)}{z - 1} \quad [13]$$

$$Gcv(z) = \frac{0.9(z - 0.975)}{z - 1}$$

Figure 7:
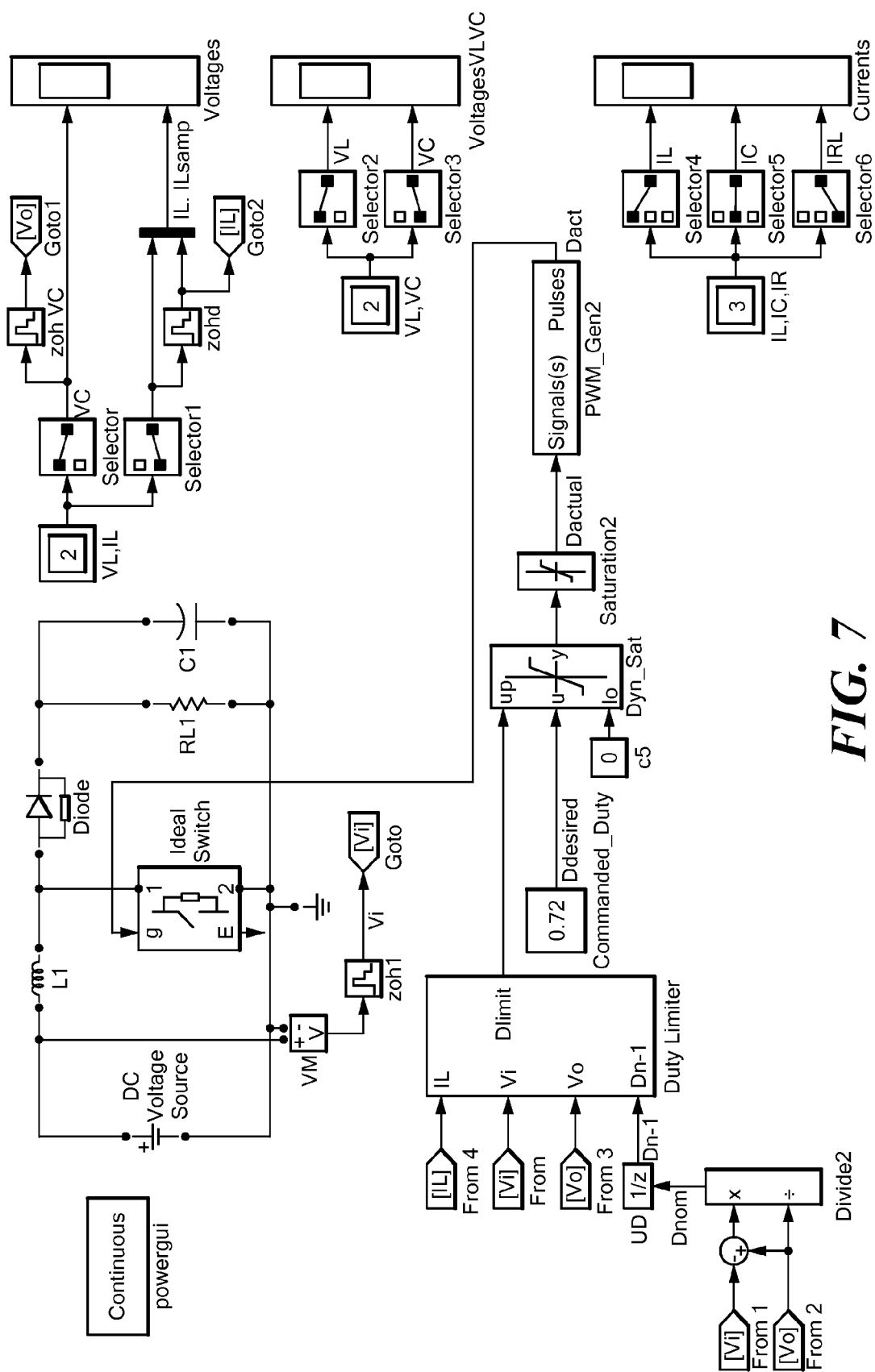
FIG. 7 provides an open-loop, Simulink® diagram of a circuit with a current limiter.
Figure 8:
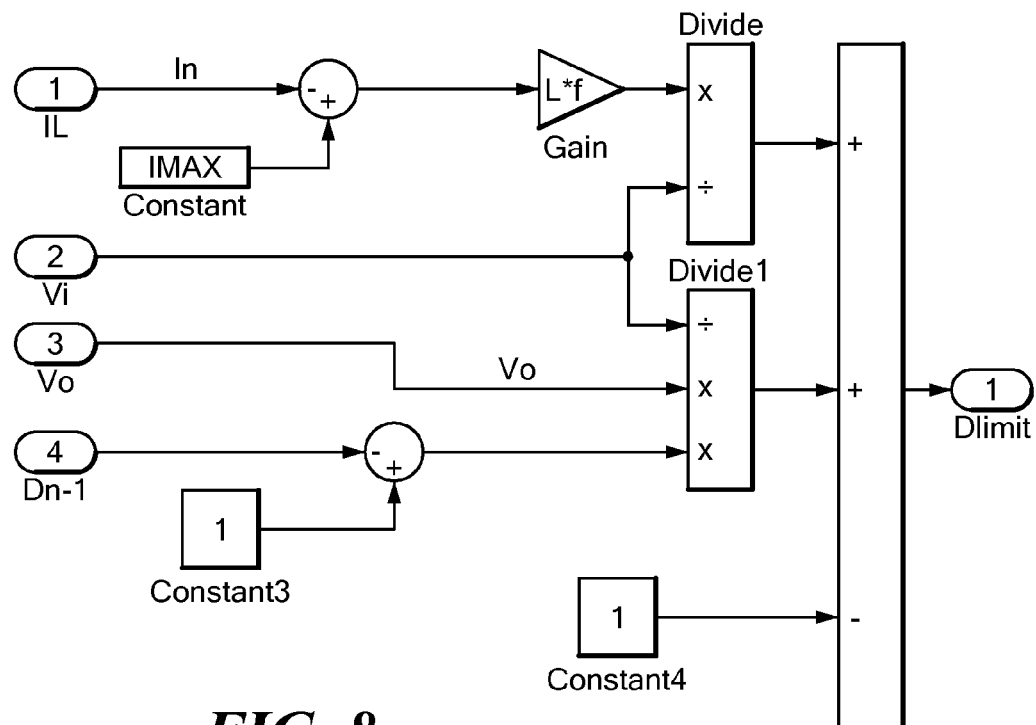
FIG. 8 provides a Simulink® diagram of the current limiter.

The limiting nature of the proposed current limiter was first verified in an open loop. The Simulink® diagram for the open loop simulations is shown in FIG. 7 and the corresponding Simulink® implementation of the limiter is shown in FIG. 8.

Figure 9:
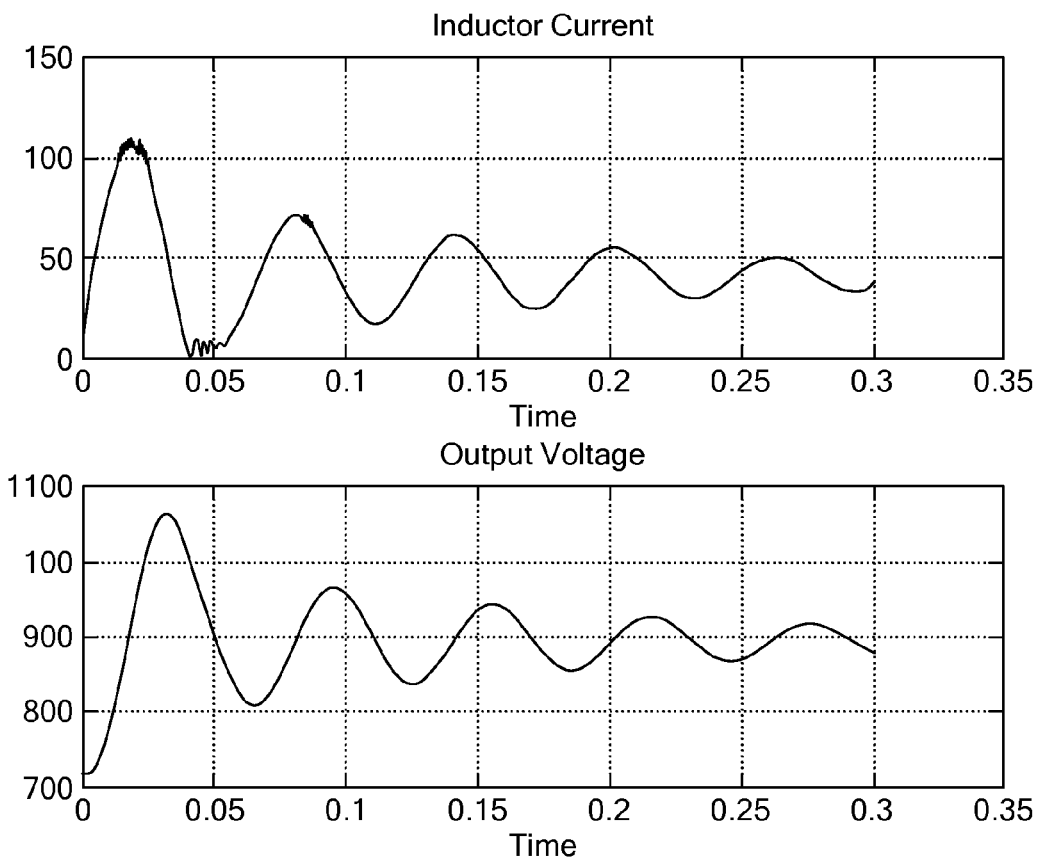
FIG. 9 provides diagrams of current and output voltage waveforms for an open-loop Simulink® circuit without a current limiter.

The simulation results in the open-loop without the current limiter are provided in FIG. 9. Of note, the inductor current resulting from a stepped duty-cycle to about 72% exceeds about 100 A. Such a result could pose serious consequence if applied to, e.g., an automotive conversion system in which the inductor saturation current is only about 20 A.

Figure 10:
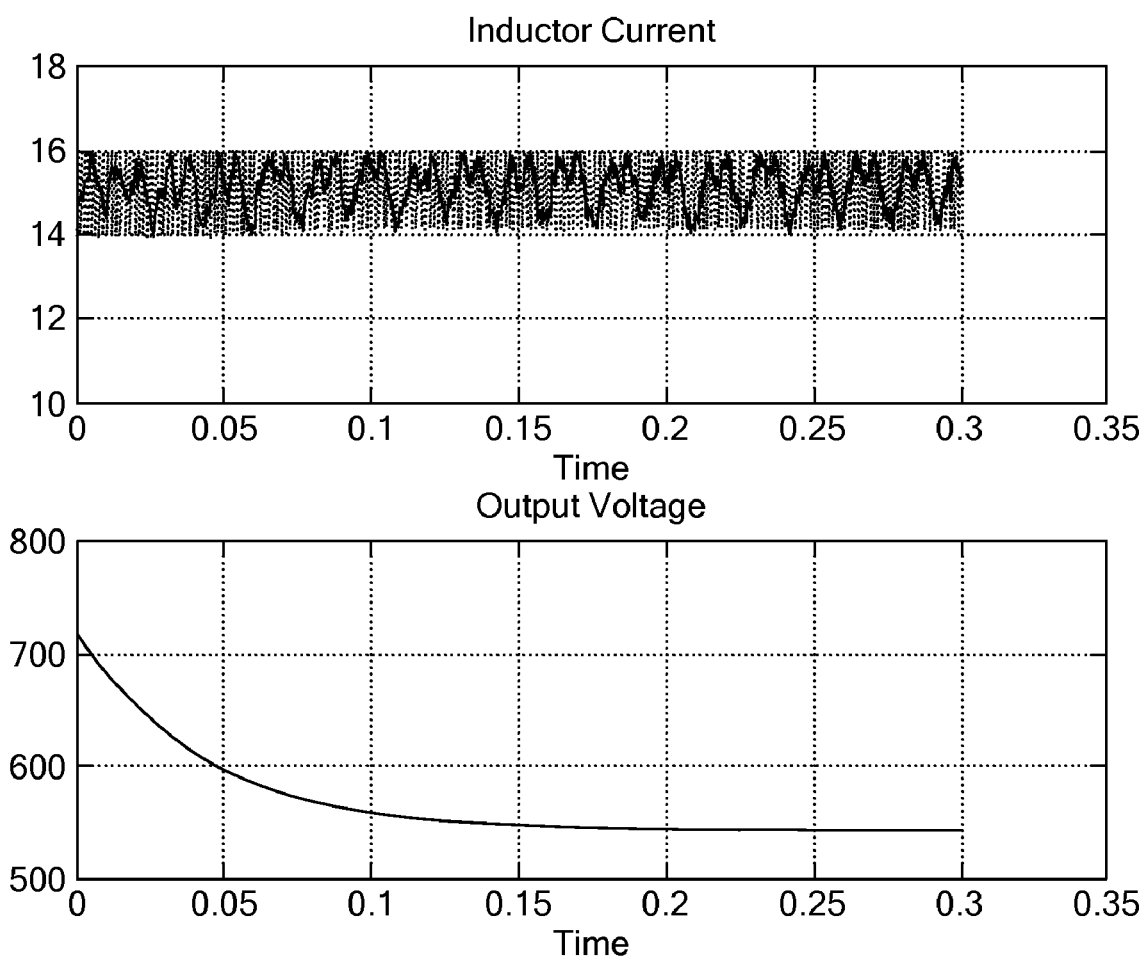
FIG. 10 provides diagrams of inductor current and output voltage waveforms for an open-loop Simulink® circuit with a current limiter.
Figure 11:
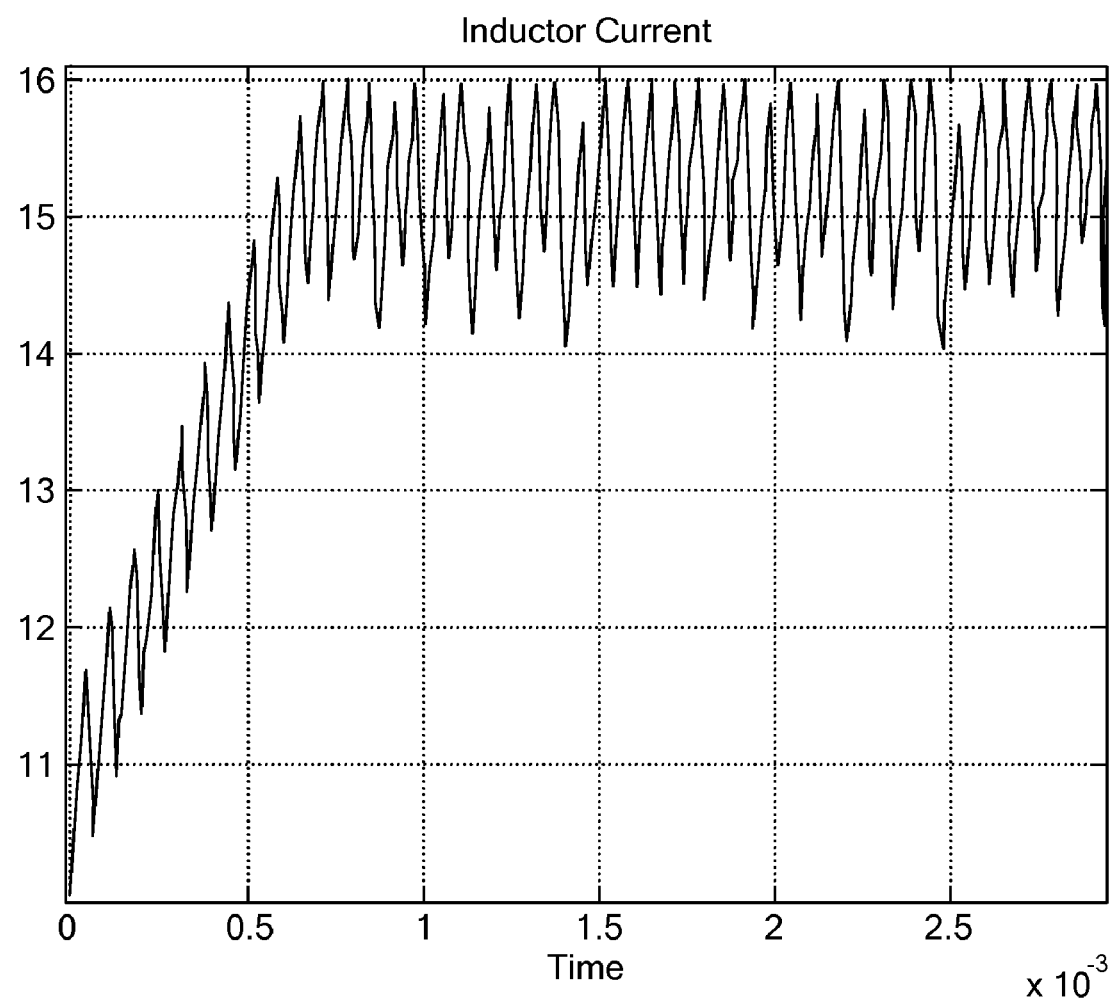
FIG. 11 provides a diagram of an inductor current waveform for an open-loop Simulink® circuit with a current limiter.

Simulation results for identical operating conditions as above but including an embodied current limiter are shown in FIGS. 10 and 11. The maximum inductor current limit value was set 16 Å and the inductor current of the circuit did not exceed about 16 A.

Figure 12:
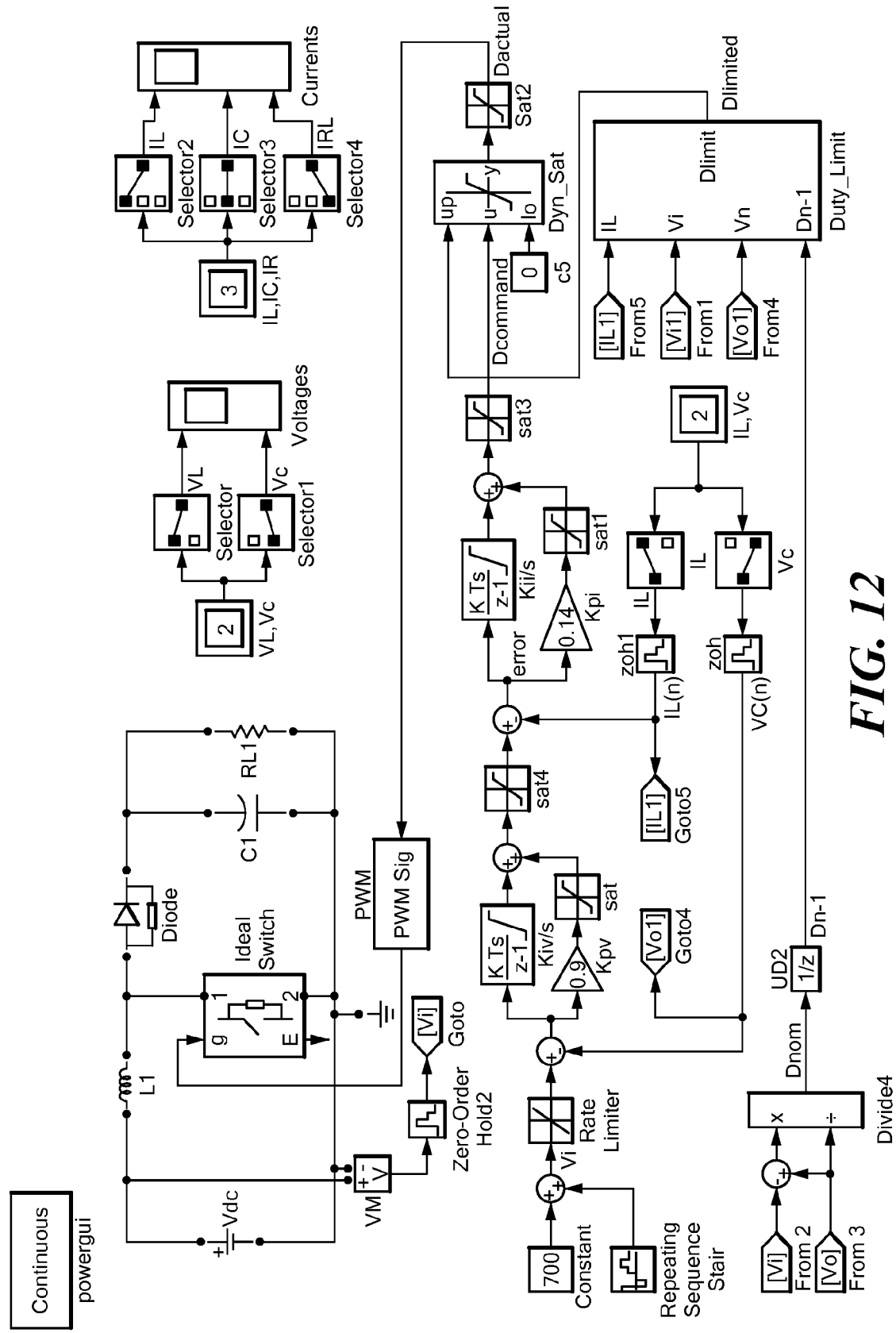
FIG. 12 provides a closed-loop, Simulink® diagram of a circuit with a current limiter.

Referring to FIG. 12, a Simulink® diagram for a closed-loop simulation is shown. To study the dynamic response of the conversion system, the effects of two loading conditions, i.e., a train of output voltage command steps and a sudden step in load, were investigated. Simulations for each loading condition were performed, initially, without a current limiter and, then, with a current limiter.

Figure 13:
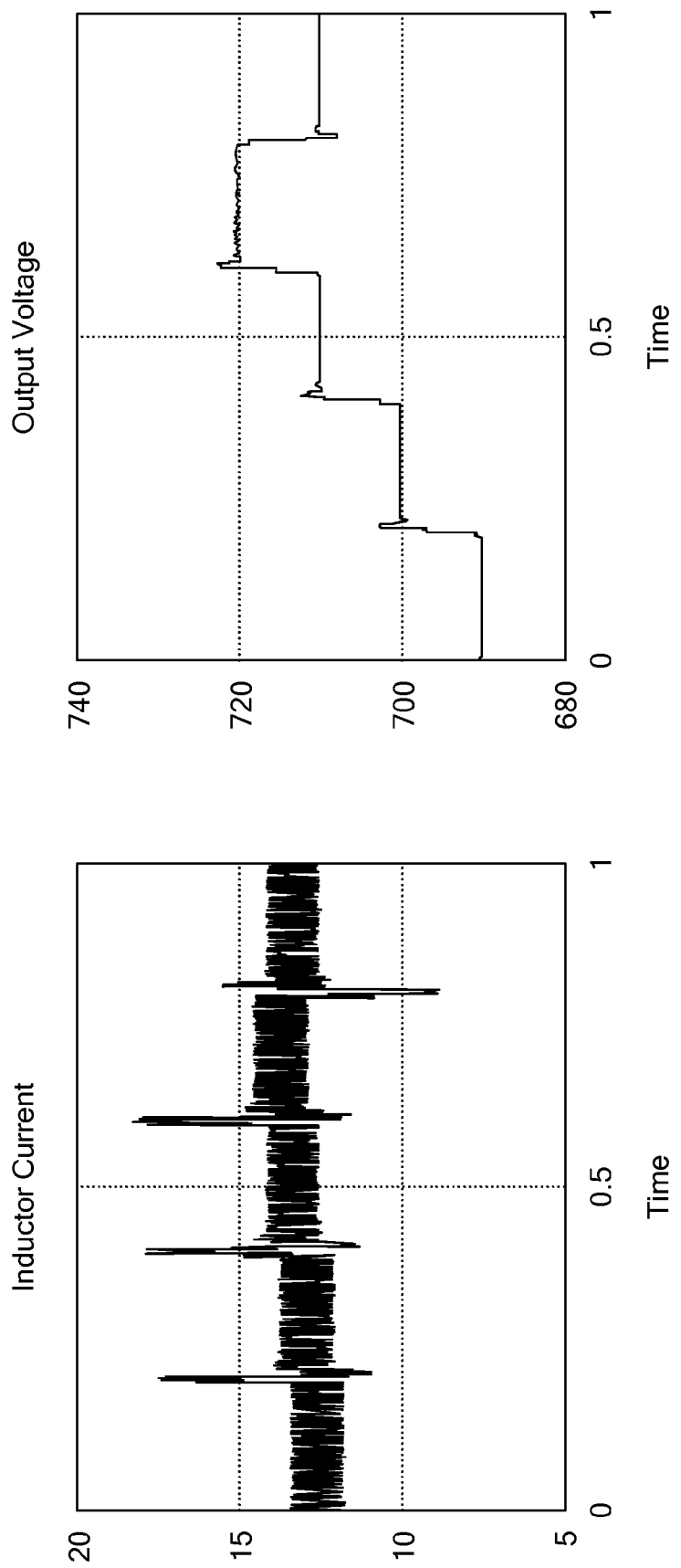
FIG. 13 provides diagrams of inductor current and output voltage waveforms for a closed-loop, Simulink® circuit without a current limiter for a train of steps.
Figure 14:
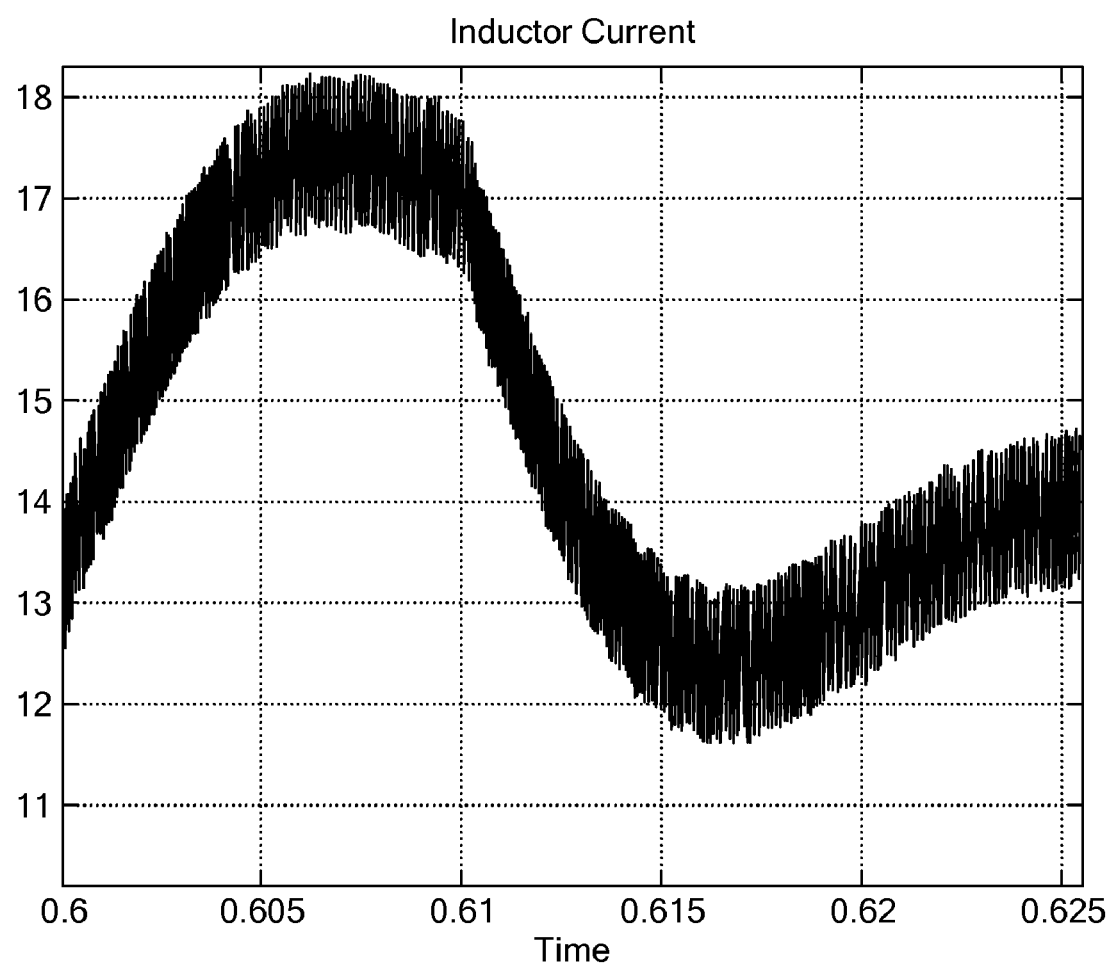
FIG. 14 provides a diagram of an inductor current waveform for a closed-loop, Simulink® circuit without a current limiter for a train of steps.

The results of simulation of the dynamic response of the system to a loading condition involving a train of steps in output voltage command without a current limiter are shown in FIGS. 13 and 14. As shown in the figures, the inductor current dynamic response to a train of steps in a closed-loop is more closely bounded than for the open-loop case. Indeed, in FIG. 13, the inductor current peaks are only about 19 A.

Figure 15:
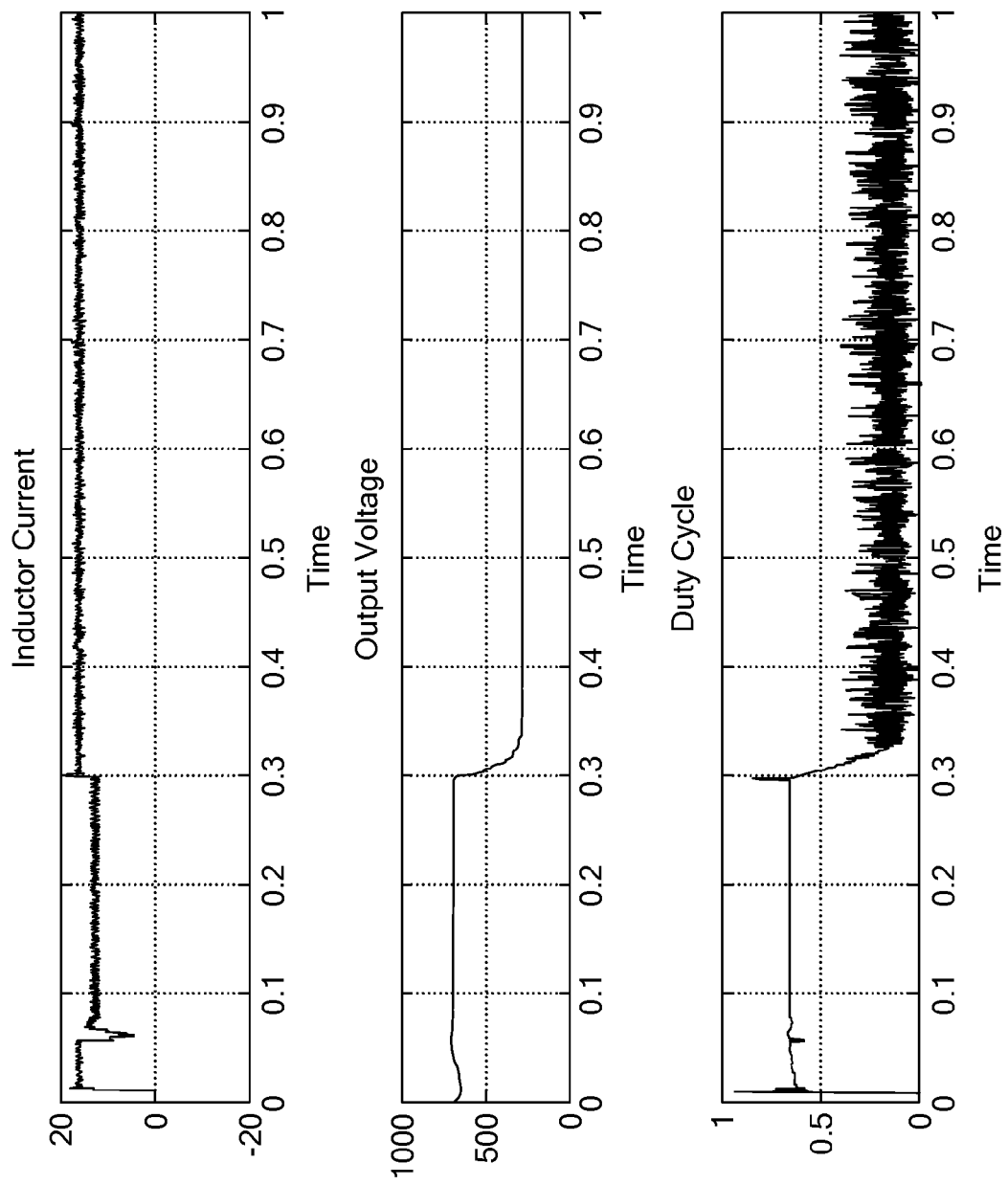
FIG. 15 provides diagrams of inductor current, output voltage, and duty-cycle waveforms for a closed-loop, Simulink® circuit without a current limiter for a single, sudden step in load.
Figure 16:
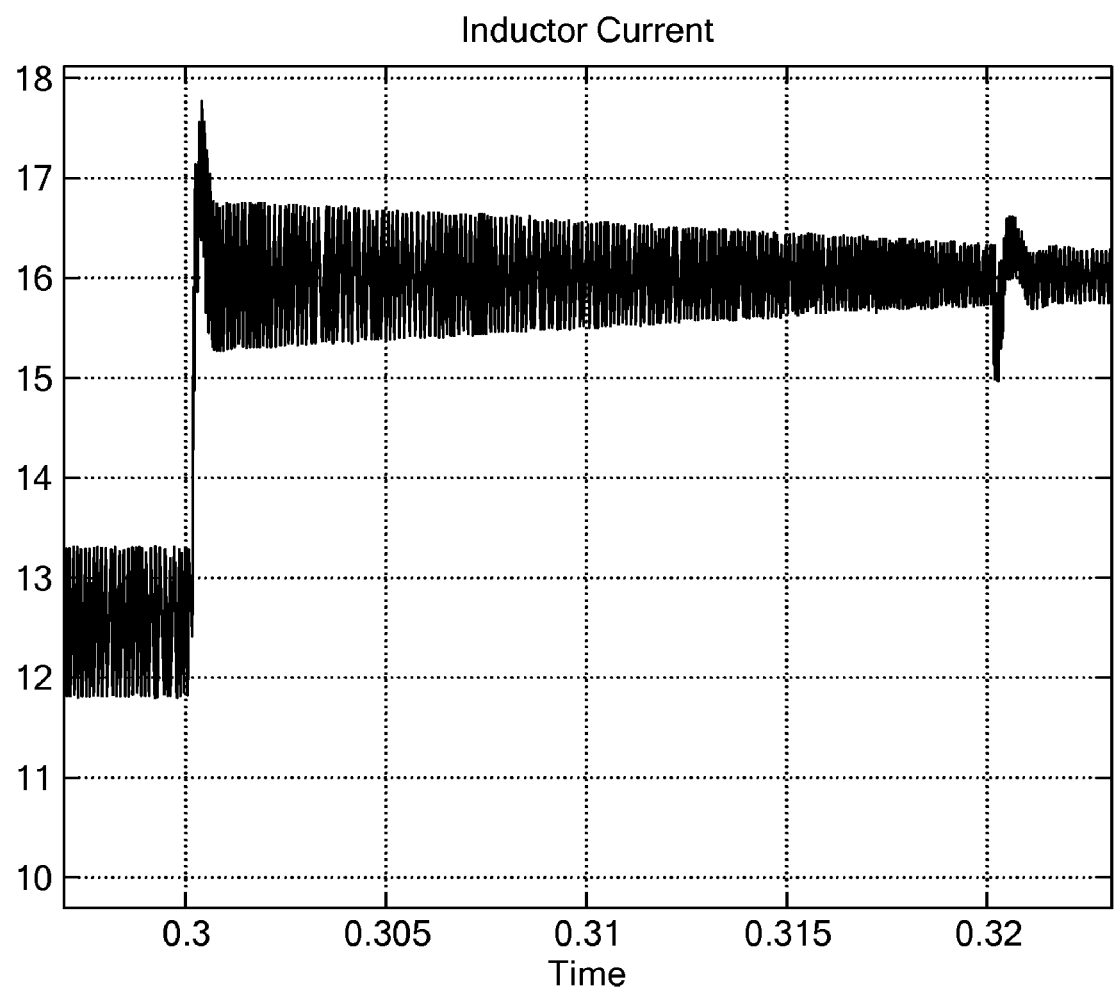
FIG. 16 provides a diagram of an inductor current waveform for a closed-loop, Simulink® circuit without a current limiter for a single, sudden step in load.

FIG. 15 provides illustrative results for the case without a current limiter. In FIG. 15, simulation of a closed-loop system response to a sudden step in load varying between about 163 Ω and about 54 Ω is shown. The input command limit of the current control loop was set to about 16 A. However, as seen in FIG. 16, this is still insufficient to maintain a peak value of the inductor current below 16 A.

Figure 17:
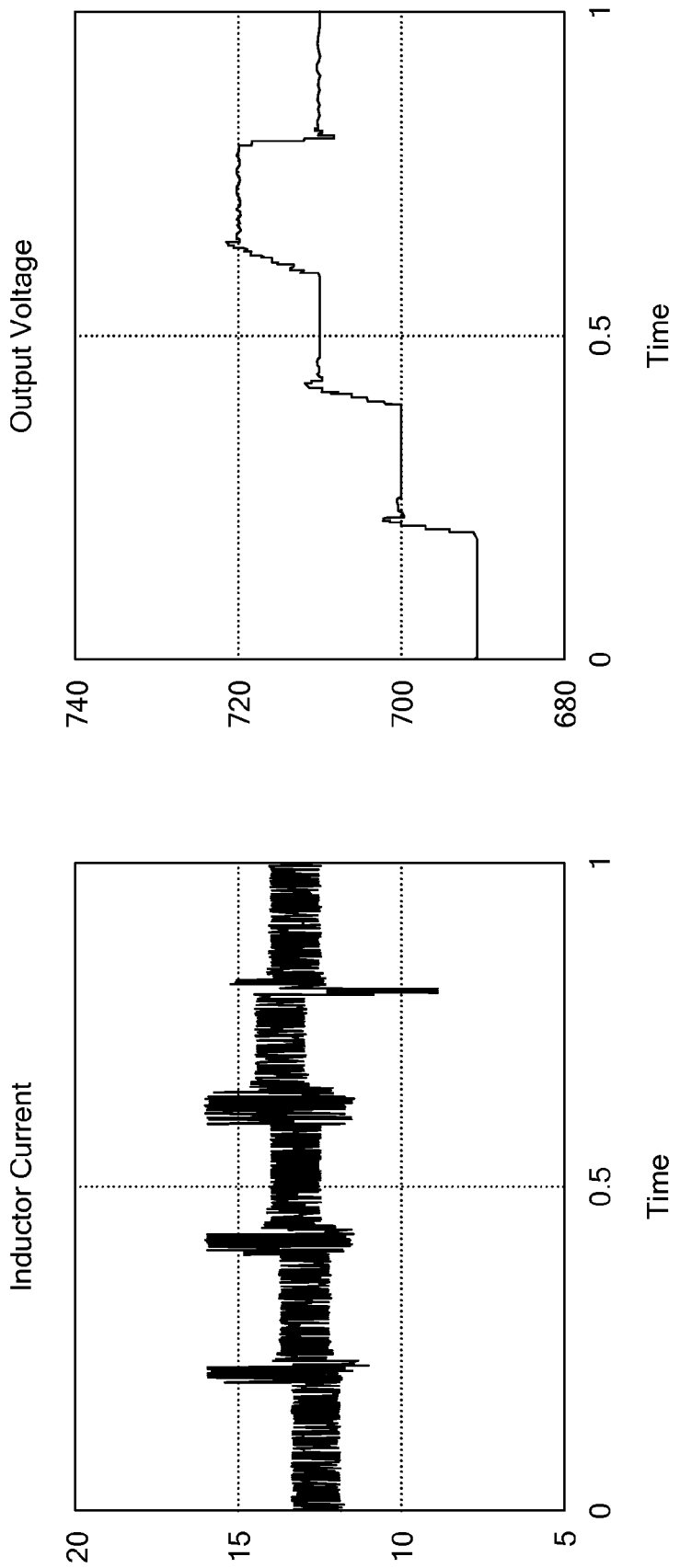
FIG. 17 provides diagrams of inductor current and output voltage waveforms for a closed-loop, Simulink® circuit with a current limiter for a train of steps.
Figure 18:
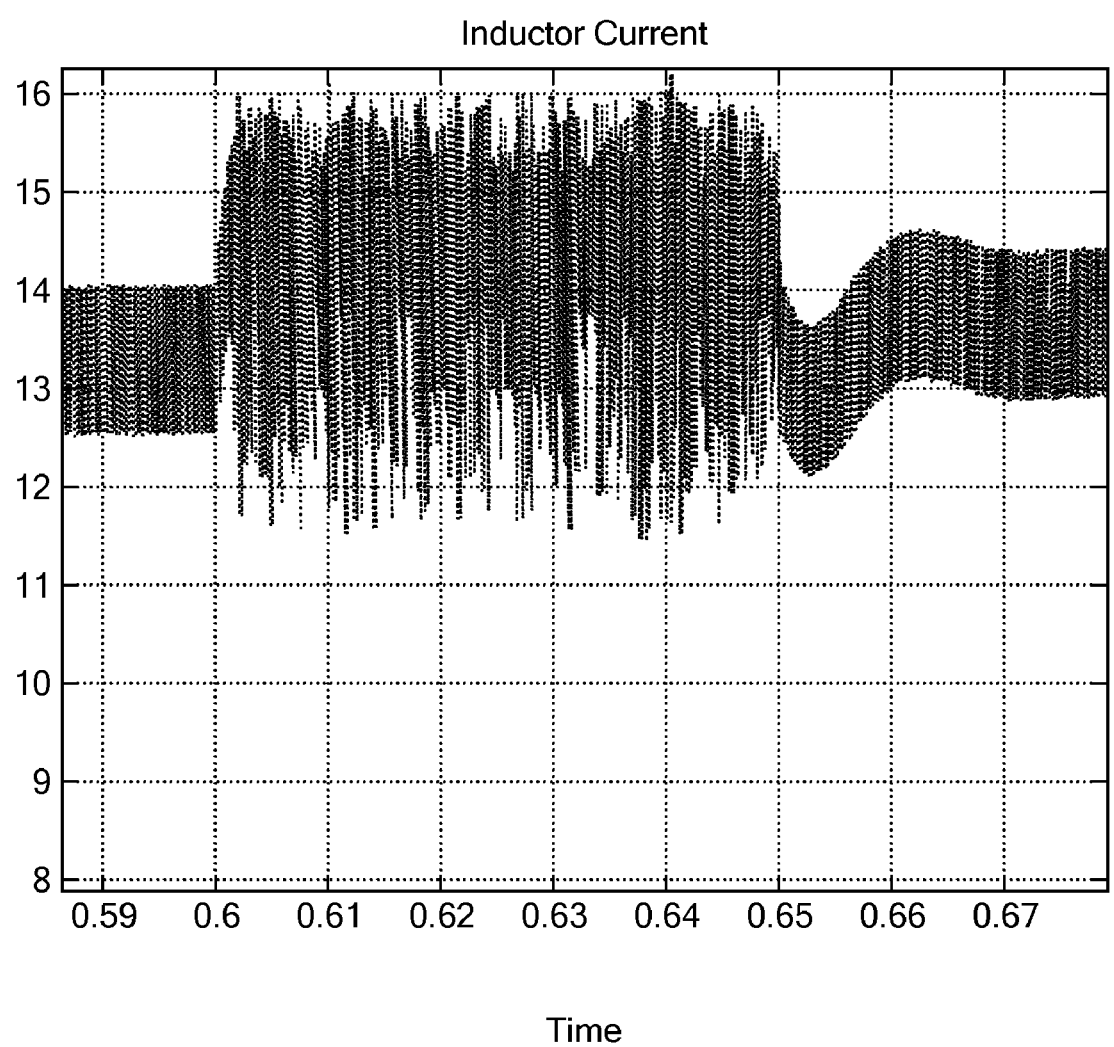
FIG. 18 provides a diagram of an inductor current waveform for a closed-loop, Simulink® circuit with a current limiter for a train of steps.

Simulation of the dynamic response of the system to a loading condition involving a train of steps in output voltage command with the embodied current limiter is shown in FIGS. 17 and 18. As shown in the figures, the inductor current dynamic response to a train of steps in output voltage command in a closed-loop is more bounded by the 16 A current limit.

Figure 19:
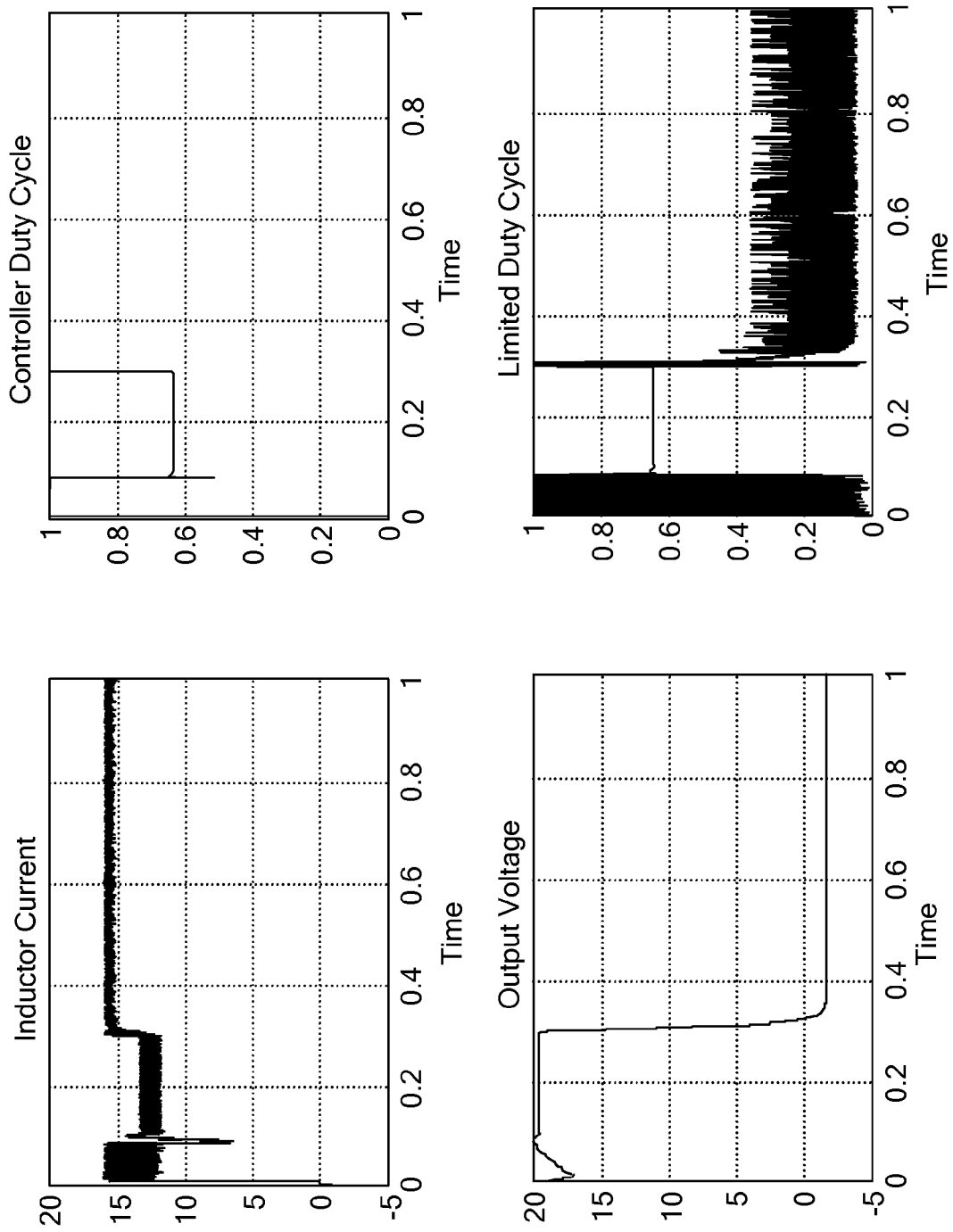
FIG. 19 provides diagrams of inductor current, output voltage, and controller duty-cycle waveforms for a closed-loop, Simulink® circuit with a current limiter for a single, sudden step in load.
Figure 20:
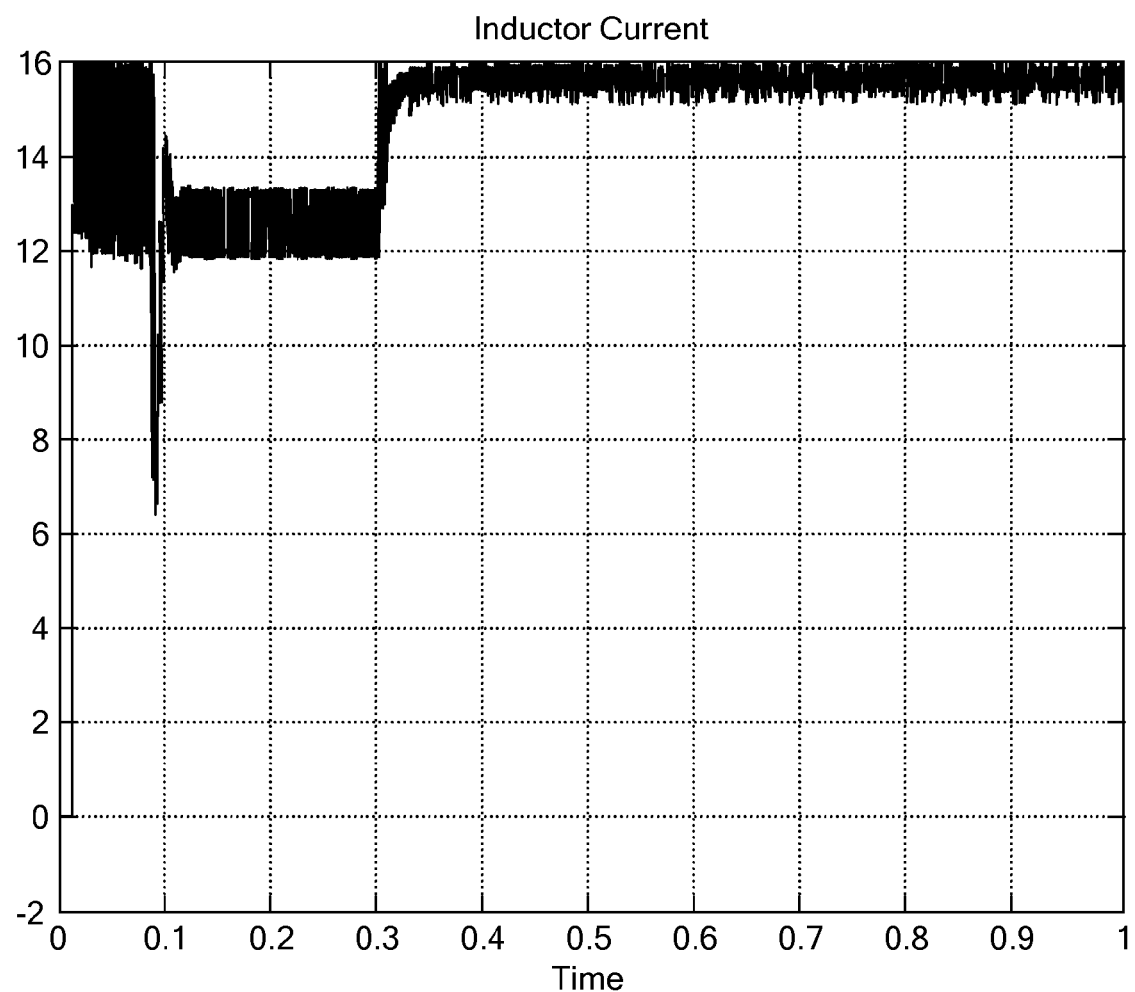
FIG. 20 provides a diagram of an inductor current waveform for a closed-loop, Simulink® circuit with a current limiter for a single, sudden step in load.

FIGS. 19 and 20 provide illustrative results for the second case with the embodied current limiter for the identical sudden step in load, e.g., from 163 Ω to 54 Ω. As with the first case, the inductor current is precisely limited to the set level of 16 A, as in the open loop case after adding the current limiter.

Experimental Results

Figure 21:
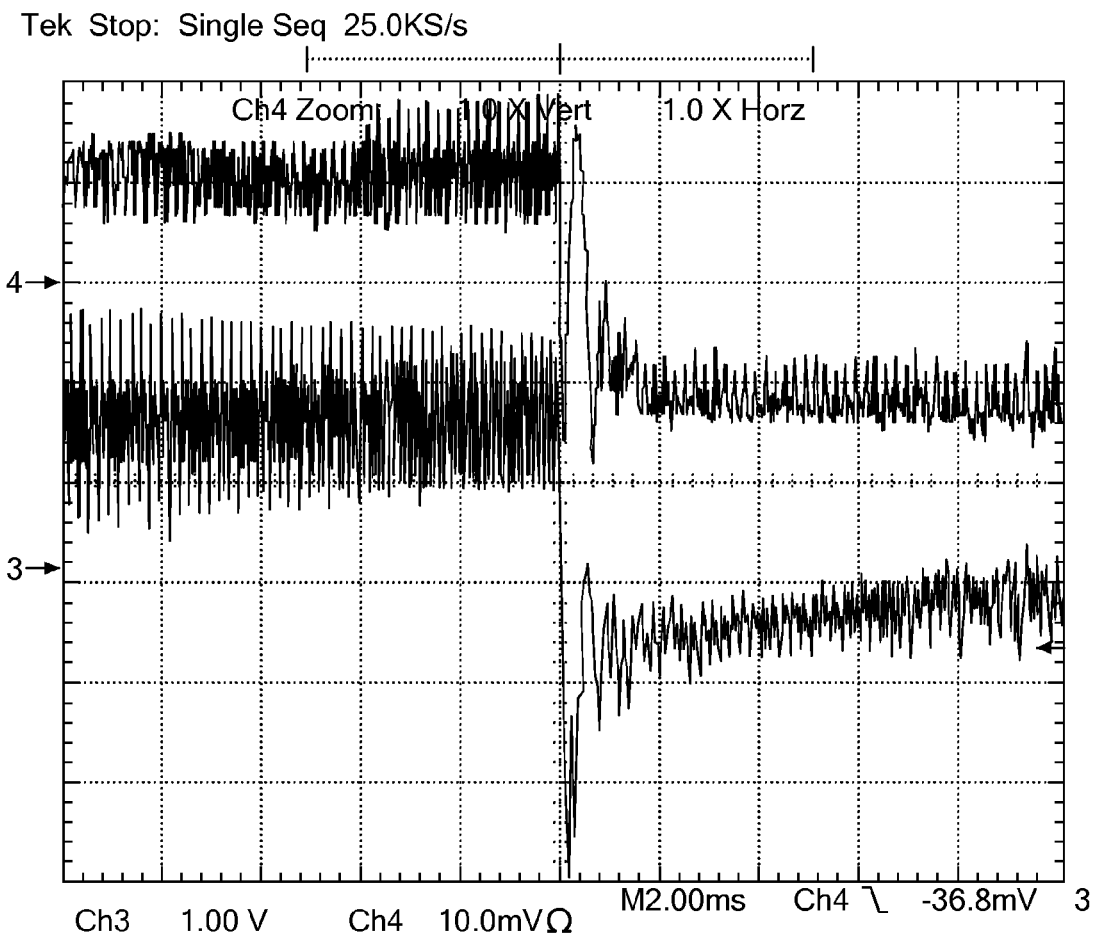
FIG. 21 provides an illustrative diagram of a negative going current.
Figure 22:
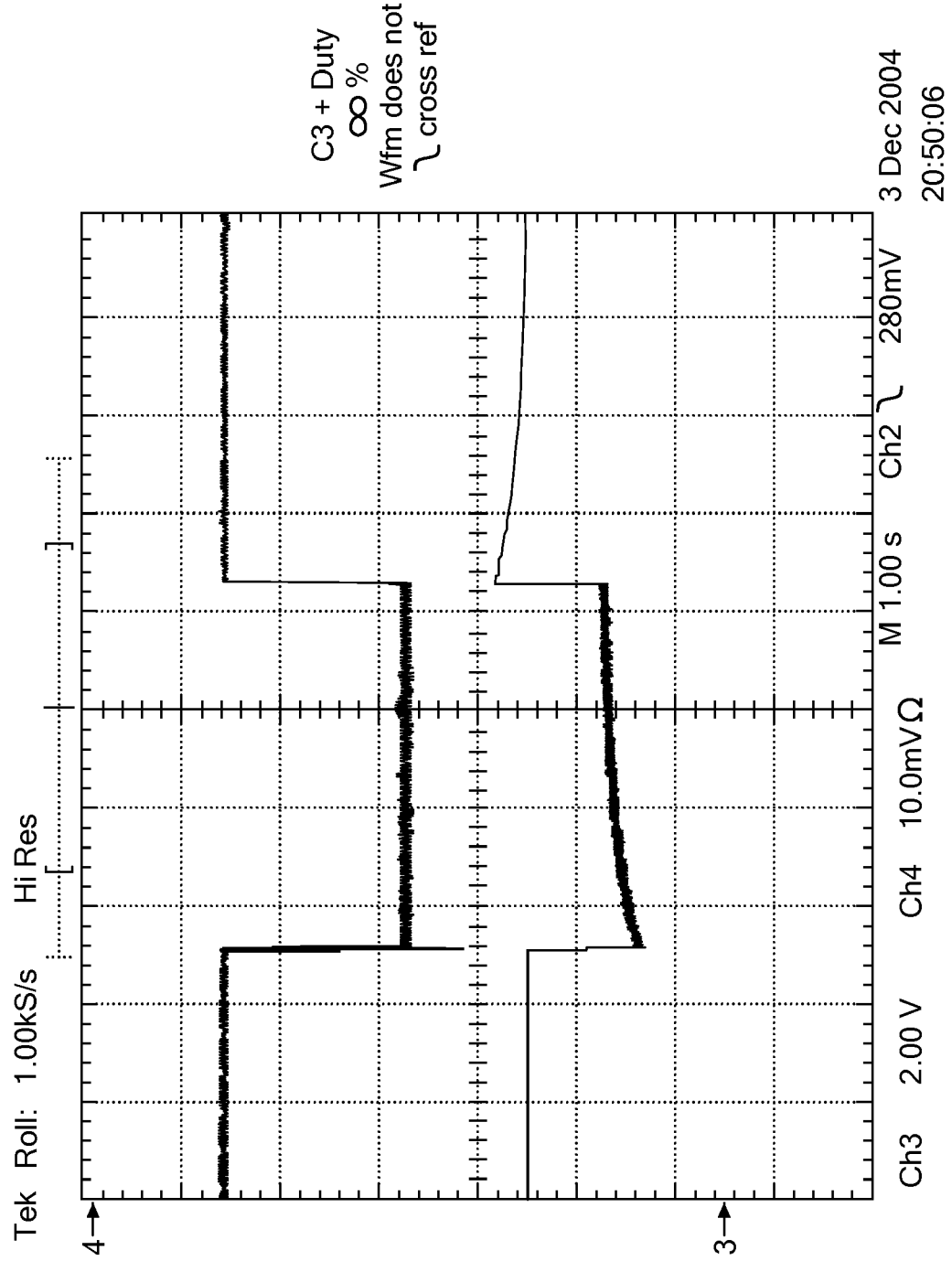
FIG. 22 provides an comparative diagram of a negatively going current and a voltage collapse due to current limiting.
Figure 23:
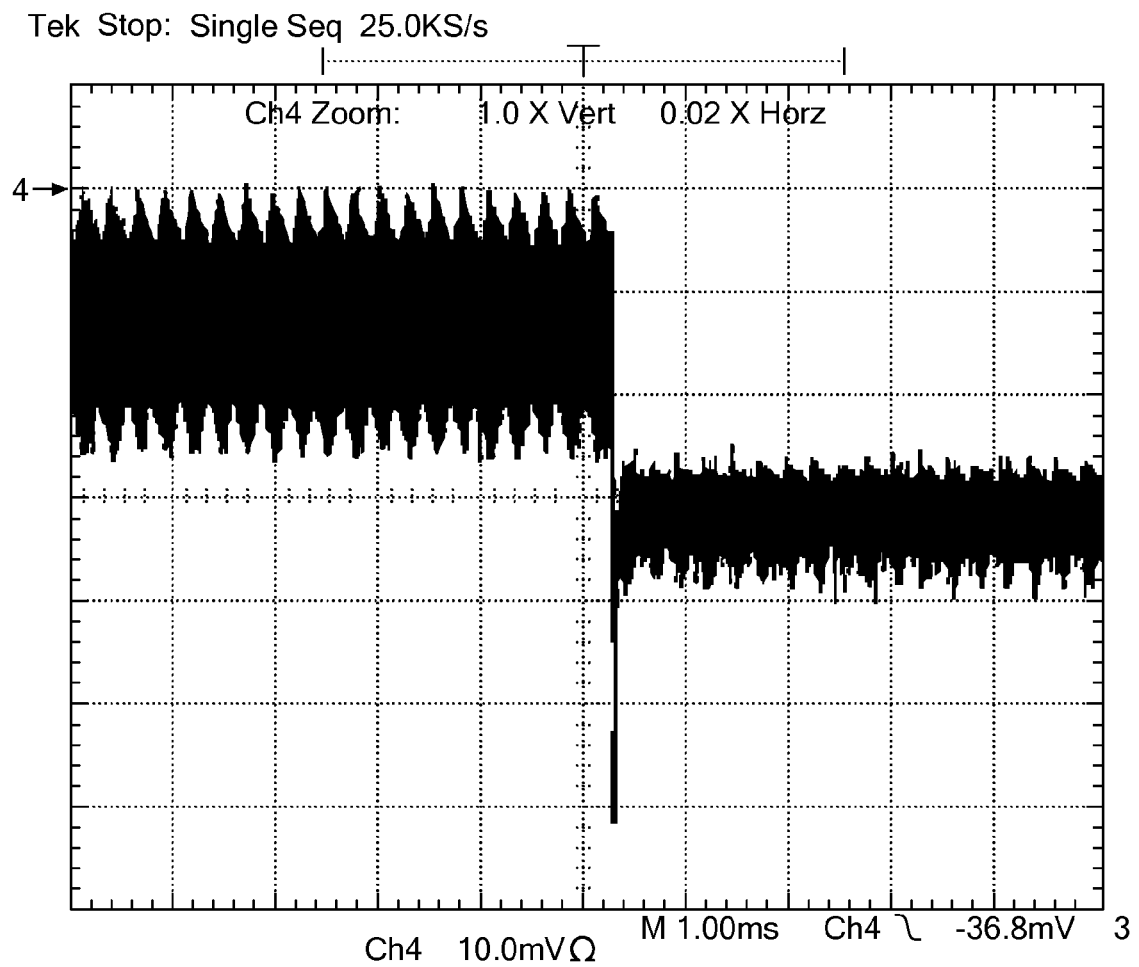
FIG. 23 provides an illustrative diagram of a reduction in ripple current due to current limiting.

The embodied methods and control software were implemented in an existing DSP-based embedded controller code (TMS320F2406) and results were verified. The experimental results are shown in FIGS. 21-23.

Many changes in the details, materials, and arrangement of parts and steps, herein described and illustrated, can be made by those skilled in the art in light of teachings contained hereinabove. Accordingly, it will be understood that the following claims are not to be limited to the embodiments disclosed herein and can include practices other than those specifically described, and are to be interpreted as broadly as allowed under the law.

What is claimed is:

1. A method of controlling inductor current levels during a second time interval (N+1) having a beginning and a duty-cycle, the second time interval (N+1) following a first time interval (N), the method comprising:
sampling a first inductor current level (I(n)) at or substantially at the beginning of the first time interval (N); and
controlling the duty-cycle in the second time interval (N+1) so that a peak inductor current level, ($I_p$(n+1)), during said second time interval (N+1) does not exceed a predetermined maximum current level, ($I_{LIMIT}$),
wherein controlling the duty-cycle includes calculating a maximum allowable duty-cycle using the equation:

$$D_{MAX}(n) = (I_{LIMIT} - I(n))\frac{L \cdot f_s}{V_i(n)} + \frac{V_o(n)}{V_i(n)}(1 - D(n-1)) - 1$$

where:
I(n) is current at or near the beginning of the first time interval (N);
L is inductance;
$f_s$ is frequency;
$V_i$(n) is one or more input voltages;
$V_o$(n) is one or more output voltages; and
D(n−1) is a duty-cycle for the first time interval (N) that was calculated during time interval (N−1) sequentially before the first time interval (N).

2. A method of calculating an allowable duty-cycle for a subsequent pulse width modulation interval (N+1), having a beginning, the subsequent pulse width modulation interval (N+1) following a first pulse width modulation interval (N), the method comprising:

sampling a first inductor current level, (I(n)), at or substantially at near the beginning of the first pulse width modulation interval (N); and sampling a second inductor current level (I(n+1), at or substantially at near the beginning of the second pulse width modulation interval (N+1);

estimating a value for the second inductor current level (I(n+1)) at the end of first pulse width modulation interval (N); and measuring one or more voltage inputs, ($V_i(n)$) and one or more voltage outputs, ($V_o(n)$), wherein the method includes calculating a maximum allowable duty-cycle ($D_{MAX}(n)$) using the equation:

$$D_{MAX}(n) = (I_{LIMIT} - I(n))\frac{L \cdot f_s}{V_i(n)} + \frac{V_o(n)}{V_i(n)}(1 - D(n-1)) - 1$$

where:

$I_{LIMIT}$ is a predetermined maximum current level;

I(n) is current at or substantially at the beginning of the first pulse width modulation interval (N);

L is inductance;

$f_s$ is frequency;

$V_i(n)$ is one or more input voltages;

$V_o(n)$ is one or more output voltages; and

D(N-1) is a duty-cycle for the first pulse width modulation interval (N) calculated during a pulse width modulation interval (N-1) that occurs sequentially before the first pulse width modulation interval (N).

3. A system for calculating an allowable duty-cycle for a subsequent pulse width modulation interval (N), the pulse width modulation interval (N) following a first pulse width modulation interval (N-1), the system comprising:

means for sampling a first inductor current level, (I(n)), at or substantially at the beginning of a first pulse width modulation interval (N);

means for sampling a second inductor current level (I(n+1)) at or substantially at the beginning of the subsequent pulse width modulation interval (N+1);

means for estimating a value for the first inductor current at or substantially at the end of the first pulse width modulation interval (N);

means for measuring one or more voltage inputs ($V_i(n)$) and one or more voltage outputs ($V_o(n)$); and means for calculating a maximum allowable duty-cycle using the equation:

$$D_{MAX}(n) = (I_{LIMIT} - I(n))\frac{L \cdot f_s}{V_i(n)} + \frac{V_o(n)}{V_i(n)}(1 - D(n-1)) - 1$$

where:

$I_{LIMIT}$ is a predetermined maximum current level;

I(n) is current at or substantially at the beginning of the first pulse width modulation interval (N);

L is inductance;

$f_s$ is frequency;

$V_i(n)$ is one or more input voltages;

$V_o(n)$ is one or more output voltages; and

D(n-1) is a duty-cycle for the first pulse width modulation interval (N) calculated during a pulse width modulation interval (N-1) that occurs sequentially before the first pulse width modulation interval (N).

4. A device for controlling inductor current levels in a circuit, the device comprising:

a controller that calculates a maximum allowable duty-cycle so that a peak current level ($I_p$ (n-1)) during a second time interval (N+1), the second time interval (N+1) sequentially following a first time interval (N), does not exceed a predetermined maximum current level, ($I_{LIMIT}$); and a duty-cycle limiter for controlling the duty-cycle of the circuit for said secondary time interval (N+1), wherein the controller is adapted to calculate the maximum allowable duty-cycle ($D_{MAX}$ (n)) by sampling a first inductor current level (I(n)) at or substantially at a beginning of the first time interval (N); by estimating a value for the first inductor current at the end of said first time interval (N); and by measuring one or more voltage inputs ($V_i(n)$) and one or more voltage outputs ($V_o(n)$), and wherein the controller calculates a maximum allowable duty-cycle using the equation:

$$D_{MAX}(n) = (I_{LIMIT} - I(n))\frac{L \cdot f_s}{V_i(n)} + \frac{V_o(n)}{V_i(n)}(1 - D(n-1)) - 1$$

where:

I(n) is current at or substantially at the beginning of the first time interval (N);

L is inductance;

$f_s$ is frequency;

$V_i(n)$ is one or more input voltages;

$V_o(n)$ is one or more output voltages; and

D(n-1) is a duty-cycle for the first time interval (N) calculated during a time interval (N-1) that occurs sequentially before the first time interval (N).

5. A device for calculating an allowable duty-cycle for a subsequent pulse width modulation interval (N+1), the device comprising:

means for sampling a first inductor current level (I(n)) at or substantially at a beginning of a first pulse width modulation interval (N);

means for sampling a second inductor current level (I(n+1)) at or substantially at a beginning of the subsequent pulse width modulation interval (N+1);

means for estimating a value for the second inductor current level at or substantially at an end of the first pulse width modulation interval (N); and means for measuring one or more voltage inputs ($V_i(n)$) and one or more voltage outputs ($V_o(n)$), wherein the device calculates a maximum allowable duty-cycle using the equation:

$$D_{MAX}(n) = (I_{LIMIT} - I(n))\frac{L \cdot f_s}{V_i(n)} + \frac{V_o(n)}{V_i(n)}(1 - D(n-1)) - 1$$

where:

$I_{LIMIT}$ is a predetermined maximum current level;

I (n) is current at or substantially at the beginning of the subsequent pulse width modulation interval (N);

L is inductance;

$f_s$ is frequency;

$V_i$ (n) is one or more input voltages;

$V_o(n)$ is one or more output voltages; and

D(n−1) is a duty-cycle for the first pulse width modulation interval (N) calculated during a pulse width modulation interval (N−1) that occurs sequentially before the first pulse width modulation interval (N).

6. A method of controlling inductor current levels during a subsequent time interval (N+1), the subsequent time interval (N+1) sequentially following a first time interval (N) having a beginning and an end, the method comprising:
measuring one or more voltage inputs ($V_i(n)$) and one or more voltage outputs ($V_o(n)$);
sampling a first inductor current level (I(n)) at or substantially at the beginning of the first time interval (N);
estimating a value for the first inductor current at or substantially at the end of first time interval (N);
estimating a duty-cycle for the subsequent time interval (N+1) using the estimated value of the first inductor current (I(n)), wherein estimating the duty-cycle includes calculating the maximum allowable duty-cycle ($D_{MAX}(n)$) using the equation:

$$D_{MAX}(n) = (I_{LIMIT} - I(n))\frac{L \cdot f_s}{V_i(n)} + \frac{V_o(n)}{V_i(n)}(1 - D(n-1)) - 1$$

where:
I(n) is current level measured at or substantially at the beginning of the first time interval (N),
L is inductance,
$f_s$ is frequency,
$V_i(n)$ is one or more input voltages,
$V_o(n)$ is one or more output voltages, and
D(n−1) is a duty-cycle for the first time interval (N) that was calculated during a time interval (N−1) sequentially before the first time interval (N); and
controlling the duty-cycle for the subsequent time interval (N+1) so that a peak inductor current level ($I_1(n+1)$) during said subsequent time interval (N+1) does not exceed a predetermined maximum current level ($I_{LIMIT}$).

7. The method as recited in claim 6, wherein estimating the duty-cycle for the subsequent time interval (N+1) includes calculating a maximum allowable duty-cycle ($D_{MAX}(n)$) during said first time interval (N).

8. The method as recited in claim 6, wherein sampling the first inductor current level (I(n)) at or substantially at the beginning of the first time interval (N) includes sampling an inductor current level immediately before the beginning of the first time interval (N) or by sampling an inductor current level immediately after the beginning of the first time interval (N).

9. A method of calculating an allowable duty-cycle for a subsequent pulse width modulation interval (N+1), having a beginning, the subsequent pulse width modulation interval (N+1) sequentially following a first pulse width modulation interval (N) having a beginning and an end, the method comprising:
measuring one or more voltage inputs ($V_i(n)$) and one or more voltage outputs ($V_o(n)$);
sampling a first inductor current level (I(n)) at or substantially at the beginning of the first pulse width modulation interval (N);
estimating a value for the first inductor current level at of substantially at the end of first pulse width modulation interval (N); and
estimating the allowable duty-cycle for the subsequent pulse width modulation interval (N+1) during said first pulse width modulation interval (N) using said estimated value of the first inductor current such that a peak inductor current level ($I_p(n+1)$) during said subsequent time interval (N+1) does not exceed a predetermined maximum current level ($I_{LIMIT}$), wherein estimating the duty-cycle includes calculating a maximum allowable duty-cycle ($D_{MAX}(n)$) during said first time interval (N) using the equation:

$$D_{MAX}(n) = (I_{LIMIT} - I(n))\frac{L \cdot f_s}{V_i(n)} + \frac{V_o(n)}{V_i(n)}(1 - D(n-1)) - 1$$

where:
I(n) is current level measured at or substantially at the beginning of the first time interval (N),
L is inductance,
$f_s$ is frequency,
$V_i(n)$ is one or more input voltages,
$V_o(n)$ is one or more output voltages, and
D(n−1) is a duty-cycle for the first time interval (N) that was calculated during a time interval (N−1) sequentially before the first time interval (N).

10. The method as recited in claim 9, wherein sampling the first inductor current level includes sampling the first inductor current level immediately before the beginning of the first pulse width modulation interval or immediately after the beginning of the first pulse width modulation interval.

11. A control program embodied in a computer-readable media that is executable on a processing device for controlling inductor current levels in a circuit during a second time interval (N+1)) that sequentially follows a first time interval (N), the program providing machine code to:
measure one or more voltage inputs ($V_i(n)$) and one or more voltage outputs ($V_o(n)$);
sample a first inductor current level (I(n)) at or substantially at a beginning of the first time interval (N);
estimate a value for the first inductor current level at or substantially at an end of first time interval (N);
estimate a duty-cycle for the second time interval (N+1) during the first time interval (N) using the estimated value of the first inductor current level so that a peak inductor current level ($I_p(n+1)$) during said second time interval (N+1) does not exceed a predetermined maximum current level ($I_{LIMIT}$);
control the duty-cycle for the second time interval (N+1) so that the peak inductor current level ($I_p(n+1)$) during said second time interval (N+1) does not exceed a predetermined maximum current level ($I_{LIMIT}$); and
providing machine code to control the duty-cycle for the second time interval (N+1) by calculating a maximum allowable duty-cycle ($D_{MAX}(n)$) during the first time interval (N) for use in the second time interval (N+1) and to calculate the maximum allowable duty-cycle using the equation:

$$D_{MAX}(n) = (I_{LIMIT} - I(n))\frac{L \cdot f_s}{V_i(n)} + \frac{V_o(n)}{V_i(n)}(1 - D(n-1)) - 1$$

where:
I(n) is current at or substantially at the beginning of the first time interval (N);
L is inductance;
$f_s$ is frequency;
$V_i(n)$ is one or more input voltages;
$V_o(n)$ is one or more output voltages; and D(n−1) is a duty-cycle for the first time interval (N) calculated during a time interval (n−1) sequentially before the first time interval (N).

12. The program as recited in claim 11, further providing machine code that samples the first inductor current level by sampling the first inductor current level immediately before the beginning of the first time interval or by sampling the first inductor current level immediately after the beginning of the first time interval.

13. A control program embodied in a Computer-readable medium that is executable on a processor, the program providing machine code to calculate an allowable duty-cycle for a subsequent pulse width modulation interval (N+1), the subsequent pulse width modulation interval (N+1) sequentially following a first pulse width modulation interval (N) having a beginning and an end, the machine code providing machine code to:
  measure one or more voltage inputs ($V_i(n)$) and one or more voltage outputs ($V_o(n)$);
  sample a first inductor current level (I(n)) at or substantially at the beginning of a first pulse width modulation interval (N); and
  estimate a value for the first inductor current level at or substantially at the end of the first pulse width modulation interval (N);
  estimate the allowable duty-cycle (D(n)) for the subsequent pulse width modulation interval (N+1) during the first pulse width modulation interval (N) using said estimated value of the first inductor current,
  wherein machine code for estimating the allowable duty-cycle includes calculating a maximum allowable duty-cycle ($D_{MAX}(n)$) using the equation:

$$D_{MAX}(n) = (I_{LIMIT} - I(n))\frac{L \cdot f_s}{V_i(n)} + \frac{V_o(n)}{V_i(n)}(1 - D(n-1)) - 1$$

where:
  $I_{LIMIT}$ is a predetermined maximum current level;
  I(n) is the first inductor current level current at or substantially at the beginning of the first pulse width modulation interval (N);
  L is inductance;
  $f_s$ is frequency;
  $V_i(n)$ is one or more input voltages;
  $V_o(n)$ is one or more output voltages; and
  D(n−1) is a duty-cycle for the first pulse width modulation interval (N), which was estimated during a pulse width modulation interval (N−1) sequentially before the first pulse width modulation interval (N).

14. The control program as recited in claims 13, the machine code further providing machine code to:
  control the allowable duty-cycle ((D (n)) for the subsequent pulse width modulation interval (N+1) so that a peak inductor current level ($I_p(n+1)$) during said subsequent time interval (N+1) does not exceed a predetermined maximum current level ($I_{LIMIT}$)

15. A system for controlling inductor current levels in a circuit, the system comprising:
  a converter having a duty-cycle for delivering power to a load;
  a controller that calculates a maximum allowable duty-cycle ($D_{MAX}(n)$) during a first time interval (N) so that a peak current level ($I_p(n+1)$) during a subsequent time interval (N+1) does not exceed a predetermined maximum current level ($I_{LIMIT}$); and
  a duty-cycle limiter that is adapted to control the converter's duty-cycle during the subsequent time interval (N+1),
  wherein the controller calculates the maximum allowable duty-cycle for the subsequent time interval (N+1) during the first time interval (N) using the equation:

$$D_{MAX}(n) = (I_{LIMIT} - I(n))\frac{L \cdot f_s}{V_i(n)} + \frac{V_o(n)}{V_i(n)}(1 - D(n-1)) - 1$$

where:
  I(n) is current at or substantially at the beginning of the first time interval (N);
  L is inductance;
  $f_s$ is frequency;
  $V_i(n)$ is one or more input voltages;
  $V_o(n)$ is one or more output voltages; and
  D(n−1) is a duty-cycle for the first time interval (N) calculated during a time interval (N−1) sequentially before the first time interval (N).

16. The system as recited in claim 15, wherein the controller is structured and arranged to calculate the maximum allowable duty-cycle ($D_{MAX}(n)$) during the first time interval (N) by sampling a first inductor current level (I(n)) at or substantially at a beginning of the first time interval (N); and by estimating a value for the first inductor current level at or substantially at the end of the first time interval (N).

17. A system for calculating an allowable duty-cycle for a subsequent pulse width modulation interval (N+1), the subsequent pulse width modulation interval (N+1) following a first pulse width modulation interval (N), the system comprising:
  means for measuring one or more voltage inputs ($V_i(n)$) and one or more voltage outputs ($V_o(n)$);
  means for sampling a first inductor current level (I(n)) at or substantially at the beginning of a first pulse width modulation interval (N);
  means for estimating a value for the first inductor current at or substantially at the end of the first pulse width modulation interval (N);
  means for calculating the allowable duty-cycle using the estimated value for the first inductor current so that a peak current level ($I_p(n+1)$) during the subsequent time interval (N+1) does not exceed a predetermined maximum current level ($I_{LIMIT}$); and
  a duty-cycle limiter that is adapted to control the duty-cycle during the subsequent pulse width modulation interval (N+1),
  wherein the calculating means calculates the maximum allowable duty-cycle using the equation:

$$D_{MAX}(n) = (I_{LIMIT} - I(n))\frac{L \cdot f_s}{V_i(n)} + \frac{V_o(n)}{V_i(n)}(1 - D(n-1)) - 1$$

where:
  I(n) is current at or substantially at the beginning of the subsequent pulse width modulation interval (N);
  L is inductance;
  $f_s$ is frequency;
  $V_i(n)$ is one or more input voltages;
  $V_o(n)$ is one or more output voltages; and
  D(n−1) is a duty-cycle for the subsequent pulse width modulation interval (N) which was estimated during a pulse width modulation interval (N−1) sequentially before the first pulse width modulation interval (N).

18. A current limiting device for controlling inductor current levels of a circuit, the device comprising:

means for sampling a first inductor current level (I n)) at or substantially at a beginning of a first time interval (N);

means for estimating a value for the first inductor current level at or substantially at an end of the first time interval (N);

means for calculating a maximum allowable duty-cycle for a subsequent time interval (N+1) that sequentially follows a first time interval (N) using the estimated value of the first inductor current level so that a peak current level ($I_p$(n+1)) does not exceed a predetermined maximum current level ($I_{LIMIT}$); and means for controlling the duty-cycle of the circuit during said subsequent time interval (N+1), wherein the calculating means calculates the maximum allowable duty-cycle using the equation:

$$D_{MAX}(n) = (I_{LIMIT} - I(n))\frac{L \cdot f_s}{V_i(n)} + \frac{V_o(n)}{V_i(n)}(1 - D(n-1)) - 1$$

where:

I(n) is current at or substantially at the beginning of the first time interval (N);

L is inductance;

$f_s$ is frequency;

$V_i(n)$ is one or more input voltages;

$V_o(n)$ is one or more output voltages; and

D(n−1) is a duty-cycle for the first time interval (N) calculated during a time interval (N−1) sequentially before the first time interval (N)

19. The device as recited in claim 18, wherein the calculating means calculates the maximum allowable duty-cycle ($D_{MAX}$(n)) for use in the subsequent time interval (N+1) during the first time interval (N).

20. A system for controlling inductor current levels in a circuit, the system comprising:

a converter for delivering power to a load during a duty-cycle;

a duty-cycle limiter for controlling the duty-cycle of the converter for a second time interval (N+1), the second time interval (N+1) following a first time interval (N); and a controller that calculates the duty-cycle so that a peak current level ($I_p$(n+1)) during the second time interval (N+1) does not exceed a predetermined maximum current level, ($I_{LIMIT}$), wherein the duty-cycle limiter controls the duty-cycle during time interval (N+1) using a maximum allowable duty-cycle, ($D_{MAX}$(n)) that is calculated using the equation:

$$D_{MAX}(n) = (I_{LIMIT} - I(n))\frac{L \cdot f_s}{V_i(n)} + \frac{V_o(n)}{V_i(n)}(1 - D(n-1)) - 1$$

where:

I (n) is current at or substantially at the beginning of the first time interval (N);

is inductance;

fis frequency;

$V_i(n)$ is one or more input voltages;

$V_o(n)$ is one or more output voltages; and

D(n−1) is a duty-cycle for the first time interval (N) calculated during a time interval (N−1) that occurs sequentially before the first time interval (N).

* * * * *

UNITED STATES PATENT AND TRADEMARK OFFICE
CERTIFICATE OF CORRECTION

PATENT NO. : 7,545,132 B2
APPLICATION NO. : 11/373722
DATED : June 9, 2009
INVENTOR(S) : Bogdan S. Borowy et al.

It is certified that error appears in the above-identified patent and that said Letters Patent is hereby corrected as shown below:

Column 15, line 54, "Å" should read --A--;

Column 17, line 31, claim 2, "(N-1)" should read --(n-1)--;

Column 19, line 37, claim 6, "($I_1(n+1)$)" should read --($I_p(n+1)$)--;

Column 20, line 33, claim 11, "(N+1))" should read --(N+1)--;

Column 21, line 2, claim 11, "(n-1)" should read --(N-1)--;

Column 21, line 10, claim 13, "Computer-readable" should read --computer-readable--;

Column 24, line 31, claim 20, "is" should read --L is--; and

Column 24, line 32, claim 20, "fis" should read --$f_s$ is--.

Signed and Sealed this

Twenty-ninth Day of December, 2009

David J. Kappos
*Director of the United States Patent and Trademark Office*